United States Patent
Anderson et al.

(10) Patent No.: US 10,761,544 B2
(45) Date of Patent: Sep. 1, 2020

(54) UNMANNED AERIAL VEHICLE (UAV)-ASSISTED WORKSITE OPERATIONS

(71) Applicant: Deere & Company, Moline, IL (US)

(72) Inventors: Noel W. Anderson, Fargo, ND (US); Tammo Wagner, Bettendorf, IA (US); Charles J. Schleusner, Urbandale, IA (US); Sebastian Blank, Bettendorf, IA (US)

(73) Assignee: Deere & Company, Moline, IL (US)

( * ) Notice: Subject to any disclaimer, the term of this patent is extended or adjusted under 35 U.S.C. 154(b) by 170 days.

(21) Appl. No.: 15/783,285

(22) Filed: Oct. 13, 2017

(65) Prior Publication Data

US 2019/0113936 A1 Apr. 18, 2019

(51) Int. Cl.
*G05D 1/10* (2006.01)
*G08G 5/00* (2006.01)
(Continued)

(52) U.S. Cl.
CPC .......... *G05D 1/101* (2013.01); *B64C 39/024* (2013.01); *G05D 1/0027* (2013.01);
(Continued)

(58) Field of Classification Search
CPC .... G05D 1/101; G05D 1/0027; G05D 1/0246; G05D 2201/0201; G05D 2201/0202;
(Continued)

(56) References Cited

U.S. PATENT DOCUMENTS 7,747,369 B2 6/2010 Koehrsen et al.
8,190,335 B2 5/2012 Vik et al.
(Continued)

FOREIGN PATENT DOCUMENTS

DE 102015013550 A1 6/2017
WO 2005122744 A1 12/2005
(Continued)

OTHER PUBLICATIONS http://www.youtube.com/watch?v=illuZPE9z5Q, Published on Apr. 16, 2016.
(Continued)

*Primary Examiner* — Nicholas Kiswanto
(74) *Attorney, Agent, or Firm* — Joseph R. Kelly; Kelly, Holt & Christenson PLLC

(57) ABSTRACT

In one example, a position of landscape modifiers within a worksite is determined and a position output indicative of the position of the landscape modifiers is generated. Based on the position output, different types of worksite areas within the worksite are identified and an area identifier output indicative of the types of worksite areas is generated, as is a location of the worksite areas within the worksite. The worksite areas are prioritized based on the type. A route is generated for an unmanned aerial vehicle (UAV) based on the prioritized worksite areas. Control signals are provided to the UAV based on the route.

In another example, a user input mechanism on a user interface is configured to receive a user input indicative of field data for a worksite and at least one vehicle control variable for controlling an unmanned aerial vehicle (UAV) to carry out a worksite mission within the worksite. Dependent variables related to the field data are calculated, as are at least one vehicle control variable, based on the received user input indicating the field data and the at least one vehicle control variable. A display of the calculated dependent variables along with the field data is generated with at least one vehicle control variable on a user interface device. Control signals are provided to the UAV based on the field data, the at least one vehicle control variable and calculated dependent variables.

20 Claims, 17 Drawing Sheets

(51) Int. Cl.
 B64C 39/02 (2006.01)
 G05D 1/02 (2020.01)
 G05D 1/00 (2006.01)
(52) U.S. Cl.
 CPC ........... *G05D 1/0246* (2013.01); *G08G 5/003* (2013.01); *G08G 5/0069* (2013.01); *B64C 2201/122* (2013.01); *G05D 2201/0201* (2013.01); *G05D 2201/0202* (2013.01)
(58) Field of Classification Search
 CPC ................ B64C 39/024; B64C 2201/122; G08G 5/003; G08G 5/0069
 See application file for complete search history.

(56) References Cited

U.S. PATENT DOCUMENTS

| | | | |
|---|---|---|---|
| 8,364,440 | B2 | 1/2013 | Putkonen |
| 8,914,215 | B2 | 12/2014 | Faivre et al. |
| 9,378,663 | B2 | 6/2016 | Jensen |
| 9,736,360 | B2 * | 8/2017 | Sasaki ................. G01C 11/06 |
| 9,786,105 | B2 * | 10/2017 | Moloney .............. G07C 5/0841 |
| 9,822,509 | B1 * | 11/2017 | Chi ..................... G06F 16/2455 |
| 10,336,543 | B1 * | 7/2019 | Sills ......................... B64D 1/22 |
| 2011/0055220 | A1 | 3/2011 | Tyburski |
| 2012/0029732 | A1 | 2/2012 | Meyer |
| 2012/0303179 | A1 | 11/2012 | Schempf |
| 2015/0106139 | A1 | 4/2015 | Jones et al. |
| 2015/0199360 | A1 | 7/2015 | Pfeiffer et al. |
| 2015/0346722 | A1 | 12/2015 | Herz |
| 2015/0348419 | A1 | 12/2015 | Matthews |
| 2016/0071223 | A1 | 3/2016 | Rupp |
| 2016/0093212 | A1 | 3/2016 | Barfield, Jr. |
| 2016/0202227 | A1 | 7/2016 | Mathur |
| 2016/0349733 | A1 | 12/2016 | Talmaki et al. |
| 2016/0363932 | A1 * | 12/2016 | Moriarity ................. G07C 5/00 |
| 2017/0031365 | A1 | 2/2017 | Sugumaran |
| 2017/0041978 | A1 * | 2/2017 | Radhakrishnan ..... B64C 39/024 |
| 2017/0075972 | A1 | 3/2017 | Fox et al. |
| 2017/0083024 | A1 | 3/2017 | Reijersen Van Buuren |
| 2017/0146990 | A1 * | 5/2017 | Wang ..................... G01S 19/43 |
| 2017/0161972 | A1 | 6/2017 | Moloney |
| 2017/0286886 | A1 * | 10/2017 | Halepatali .............. G08G 1/202 |
| 2017/0315553 | A1 | 11/2017 | Kadono |
| 2017/0315561 | A1 | 11/2017 | Kadono |
| 2018/0069933 | A1 | 3/2018 | Chandra |
| 2018/0111683 | A1 * | 4/2018 | Di Benedetto ........ G06Q 30/04 |
| 2018/0188747 | A1 | 7/2018 | Venturelli |
| 2018/0196438 | A1 | 7/2018 | Newlin |
| 2018/0293898 | A1 * | 10/2018 | Redmann ............... G08G 5/006 |
| 2019/0066503 | A1 * | 2/2019 | Li .......................... G08G 1/168 |
| 2019/0114847 | A1 | 4/2019 | Wagner et al. |
| 2019/0130768 | A1 * | 5/2019 | Clark ................. G06K 9/00637 |

FOREIGN PATENT DOCUMENTS

| | | |
|---|---|---|
| WO | 2008092983 A1 | 8/2008 |
| WO | 2015103689 A1 | 7/2015 |
| WO | 2016037105 A1 | 3/2016 |
| WO | 2016210156 A1 | 12/2016 |

OTHER PUBLICATIONS https://forums.ni.com/t5/LabVIEW/Question-How-to-make-a-radarsimulation-on-XY-Graph/td-p/3549687/page/3 Dec. 10, 2016 12:28 PM.
Jae Sung Kim et al., "Automated Georeferencing of Historic Aerial Photography", 2010 The Purdue University Press. ISSN 1946-1143, Journal of Terrestrial Observation vol. 2, Issue 1, Winter 2010, Article 6. 10 pages.
U.S. Appl. No. 15/783,277, filed Oct. 13, 2017, Application and Drawings. 59 pages.
Worksite Soil Volume Sensing (Defensive Publication) created on Feb. 2017, 3 pages.
German Search Report issued in counterpart application No. 102018215563.1 dated May 23, 2019. (10 pages).
U.S. Appl. No. 15/783,277 Office Action dated Oct. 3, 2019, 17 pages.
English Translation from WIPO Patentscope of WO20160371 (Year 2019), 28 pages.
U.S. Appl. No. 15/783,277 Office Action dated Apr. 10, 2020, 19 pages.

* cited by examiner

UNMANNED AERIAL VEHICLE (UAV)-ASSISTED WORKSITE OPERATIONS

FIELD OF THE DESCRIPTION

The present description relates to worksite operations. More specifically, the present description relates to using an unmanned aerial vehicle (UAV) in performing worksite operations.

BACKGROUND

There are many different types of mobile machines. Some such mobile machines include agricultural machines, construction machines, forestry machines, turf management machines, among others. Many of these pieces of mobile equipment have mechanisms that are controlled by an operator in performing operations. For instance, a construction machine can have multiple different mechanical, electrical, hydraulic, pneumatic and electro-mechanical subsystems, among others, all of which can be operated by the operator.

Construction machines are often tasked with transporting material across a worksite, or into or out of a worksite, in accordance with a worksite operation. Different worksite operations may include moving material from one location to another or leveling a worksite, etc. During a worksite operation, a variety of construction machines may be used, including articulated dump trucks, wheel loaders, graders, and excavators, among others. Worksite operations may involve a large number of steps or phases and may be quite complex.

The discussion above is merely provided for general background information and is not intended to be used as an aid in determining the scope of the claimed subject matter.

SUMMARY

In one example, a position of landscape modifiers within a worksite is determined and a position output indicative of the position of the landscape modifiers is generated. Based on the position output, different types of worksite areas within the worksite are identified and an area identifier output indicative of the types of worksite areas is generated, as is a location of the worksite areas within the worksite. The worksite areas are prioritized based on the type. A route is generated for an unmanned aerial vehicle (UAV) based on the prioritized worksite areas. Control signals are provided to the UAV based on the route.

In another example, a user input mechanism on a user interface is configured to receive a user input indicative of field data for a worksite and at least one vehicle control variable for controlling an unmanned aerial vehicle (UAV) to carry out a worksite mission within the worksite. Dependent variables related to the field data are calculated, as are at least one vehicle control variable, based on the received user input indicating the field data and the at least one vehicle control variable. A display of the calculated dependent variables along with the field data is generated with at least one vehicle control variable on a user interface device. Control signals are provided to the UAV based on the field data, the at least one vehicle control variable and calculated dependent variables.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
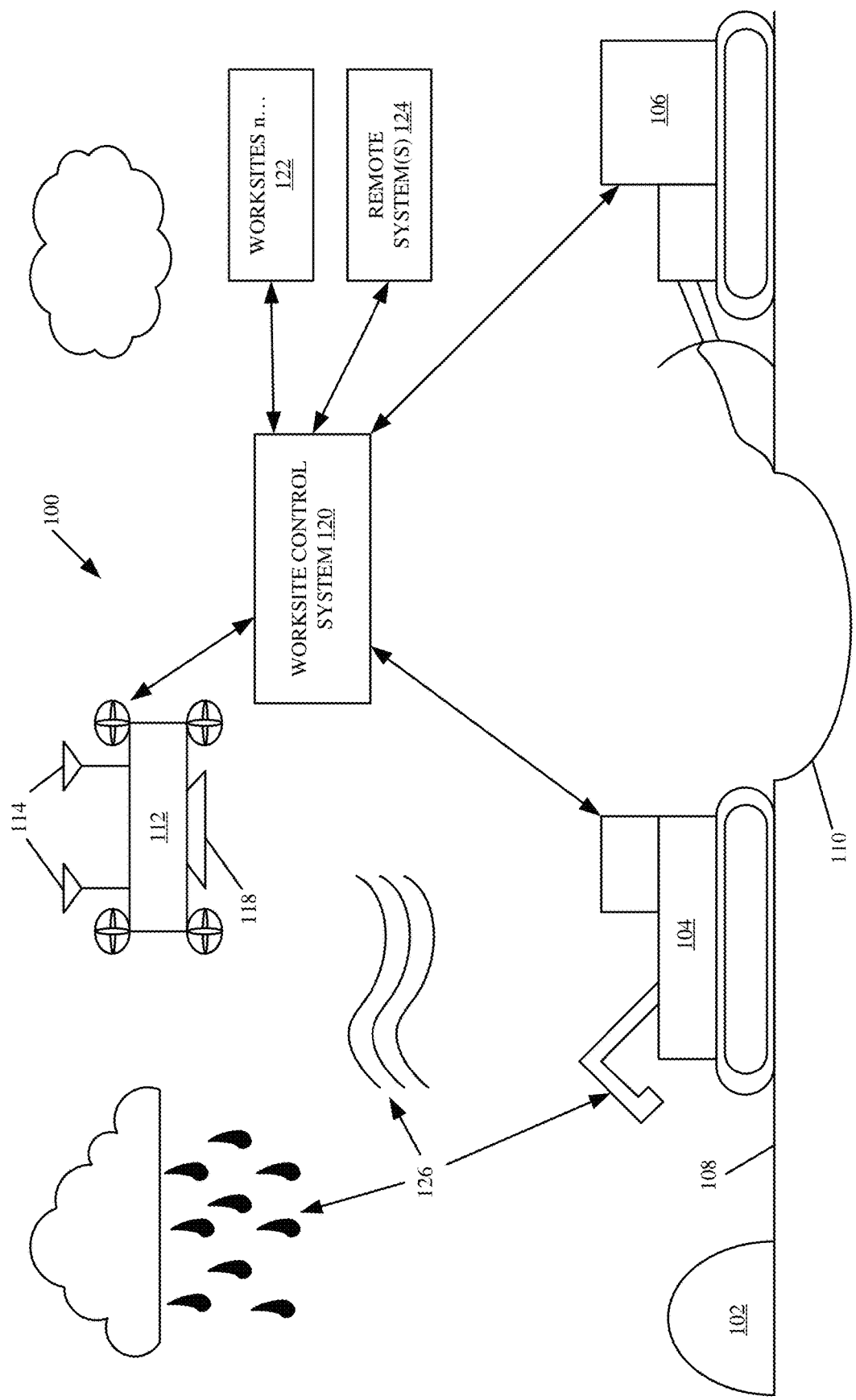
FIG. 1 is a diagram of one example of a worksite architecture.

In carrying out a worksite operation, it may be desired to utilize an unmanned aerial vehicle (UAV) to obtain worksite data which can include topographical information, mobile machine positioning information, among other types of information. The obtained worksite data can be used by a worksite manager to track a progress of a worksite operation in addition to tracking a productivity of the various mobile machines involved in the worksite operation. However, UAVs often have limited battery life, and, as such, it is important to generate routes that maximize the area flown given the battery life of the UAV. Current attempts to fly UAVs over a worksite have included flying the UAVs over the entire worksite on a periodic basis such as weekly, daily, or hourly. However, this often requires multiple UAVs to cover the entire worksite in a timely fashion, yet large parts of the worksite may be unaltered from the previous flight. In one example of the present description, a worksite control system is provided that includes a flight plan system that increases efficiency by determining a route for a UAV based on identified types of worksite areas within a worksite.

Additionally, to accurately obtain worksite data, it can be important to set good operating parameters for the UAV. This can include setting information relating to a camera configuration of the UAV, field data pertaining to a worksite, and mission planning variables such as a planned altitude, for example, among other variables. However, a user inputting this information is not often aware of the interrelationships between this information and how adjusting one of the variables will affect the remaining variables. In one example of the present description, a user interface is provided that simplifies the process of setting the operating parameters for the UAV. Based on the received user input, this can include calculation logic determining values for the dependent variables, using relationships amongst the worksite data, and subsequently generating control signals to the UAV indicative of determined operating parameters.

Further, during a worksite operation, it may be important to determine whether information obtained for a given worksite area is up-to-date and accurate. For example, if worksite data is obtained that is not indicative of a current state at a worksite area, an erroneous productivity value can be assigned to a plurality of mobile machines as well as an inaccurate determination of progress towards completing a worksite goal. In one example of the present description, a user interface is provided that displays worksite areas on a user interface device with visual cues indicating a "freshness" of worksite data pertaining to a given worksite area. For example, based on worksite data obtained for a given worksite area, an update value can be calculated and assigned to the given worksite area. Control signals can then be generated to control the user interface device to display the update value by incorporating visual cues indicative of the calculated update values or "freshness" of the worksite data on the user interface device.

Additionally, to accurately determine a state of a worksite in terms of how much work is being completed and where, etc., it can sometimes be important to obtain worksite data that has a high degree of quality. For example, if image data is obtained from a UAV that is blurred, topographical information derived from the blurred image may lead to inaccuracies in determining a current state of a worksite. In one example of the present description, a data quality can be monitored by a worksite control system that includes a data quality system configured to monitor a quality of the obtained worksite data, and can subsequently generate control signals to mobile machines based on a worksite data quality.

During a worksite operation, it may also be desired to monitor a productivity of a multitude of worksite mobile machines to ensure that a worksite goal will be achieved on-time. Additionally, it may also be desired to maintain an accurate worksite map of a worksite. However, in determining the state of a worksite in terms of work being completed, where work is being done, how to deploy machines, etc., error can often be introduced from a variety of sources. For instance, error can include measurement errors made by measuring devices, blade side material loss effects and track effects that can affect estimates of how much material is moved, among other sources of error. To address introduced error affecting a productivity of mobile machines and an accuracy of a worksite map, a worksite control system can be provided that, in one example, includes an error calculation system configured to control a UAV based on a determined amount of error within the received worksite data. The UAV is controlled to obtain additional information that can be used to address the accumulated error.

FIG. 1 is a diagram of one example of a worksite architecture (or worksite area) 100. A worksite area 100 illustratively includes landscape modifiers that operate to modify certain characteristics of the worksite area 100. They can include rain, wind, and a plurality of mobile machines 104 and 106. In the example shown in FIG. 1, worksite area 100 also illustratively includes a worksite control system 120, a remote system(s) 124, an unmanned aerial vehicle (UAV) 112 and a worksite surface 108 that includes a pile of material 102 and a hole 110. While mobile machines 104 and 106 illustratively include an excavator and a dozer, respectively, it is to be understood that any combination of mobile machines may be used in accordance with the present description. In one example, mobile machine 104 is configured to move material from pile of material 102 to worksite surface 108. Additionally, mobile machine 106, in one example, is configured to level worksite surface 108. However, mobile machines 104 and 106 can be configured to carry out any type of work corresponding to a worksite operation.

UAV 112, in one example, is configured to obtain and transmit worksite data from worksite area 100. In one example, the worksite data may include topographical information, a position of mobile machines 104 and 106, or any other information pertaining to worksite area 100. UAV 112, as illustratively shown, includes sensor(s) 118 and communication system(s) 114. In one example, sensor(s) 118 can include an image acquisition system configured to acquire image data of worksite area 100. Additionally, communication system(s) 114, in one example, allow UAV 112 to communicate with mobile machines 104 and 106, worksite control system 120 and/or remote system(s) 124. In one example, communication system(s) 114 can include a wired or wireless communication system and/or a satellite communication system, a cellular communication system, a near field communication system among many other systems or combinations of systems.

It will be noted that, in one example, each of mobile machines 104 and 106 and UAV 112, or a subset of the machines, may have their own worksite control system 120 which can communicate with other control systems 120 and/or one or more remote system(s) 124. Additionally, parts of system 120 can be disposed on each UAV 112 and mobile machine 104 and 106, and parts can be on a central system 120. For purposes of the present discussion, it will be assumed that worksite control system 120 is a central system that communicates with each UAV 112 and mobiles machines 104 and 106, but this is just one example.

During a worksite operation, worksite control system 120 obtains worksite data from UAV 112 and mobile machines 104 and 106, and generates a user interface and control signals based on the received worksite data. This is discussed in more detail later. Briefly, however, this can include receiving worksite data from UAV 112 and/or mobile machines 104 and 106, determining a route for UAV 112, calculating a worksite data quality and error, and generating a user interface configured to allow an operator to set operating parameters for UAV 112 and view visual cues corresponding to determined update values for the received worksite data.

In one example, UAV 112 and mobile machines 104 and 106 communicate through a wired or wireless communication link over a network (such as the Internet or other network or combination of networks). It can include a cellular communication system, a messaging system, or a wide variety of other communication components, some of which are described in more detail below. Additionally, in some examples, personnel located at a worksite are also in communication with worksite control system 120. Further, as illustratively shown, in some examples, UAV 112 and mobile machines 104 and 106 can communicate with other mobile machines located at other worksite area(s) 122. Additionally, while FIG. 1 shows that UAV 112, mobile machines 104 and 106, and worksite control system 120 are able to connect with a single remote system 124, remote system 124 can include a wide variety of different remote systems (or a plurality of remote systems) including a remote computing system accessible by UAV 112, mobile machines 104 and 106, and worksite control system 120.

Figure 2A:
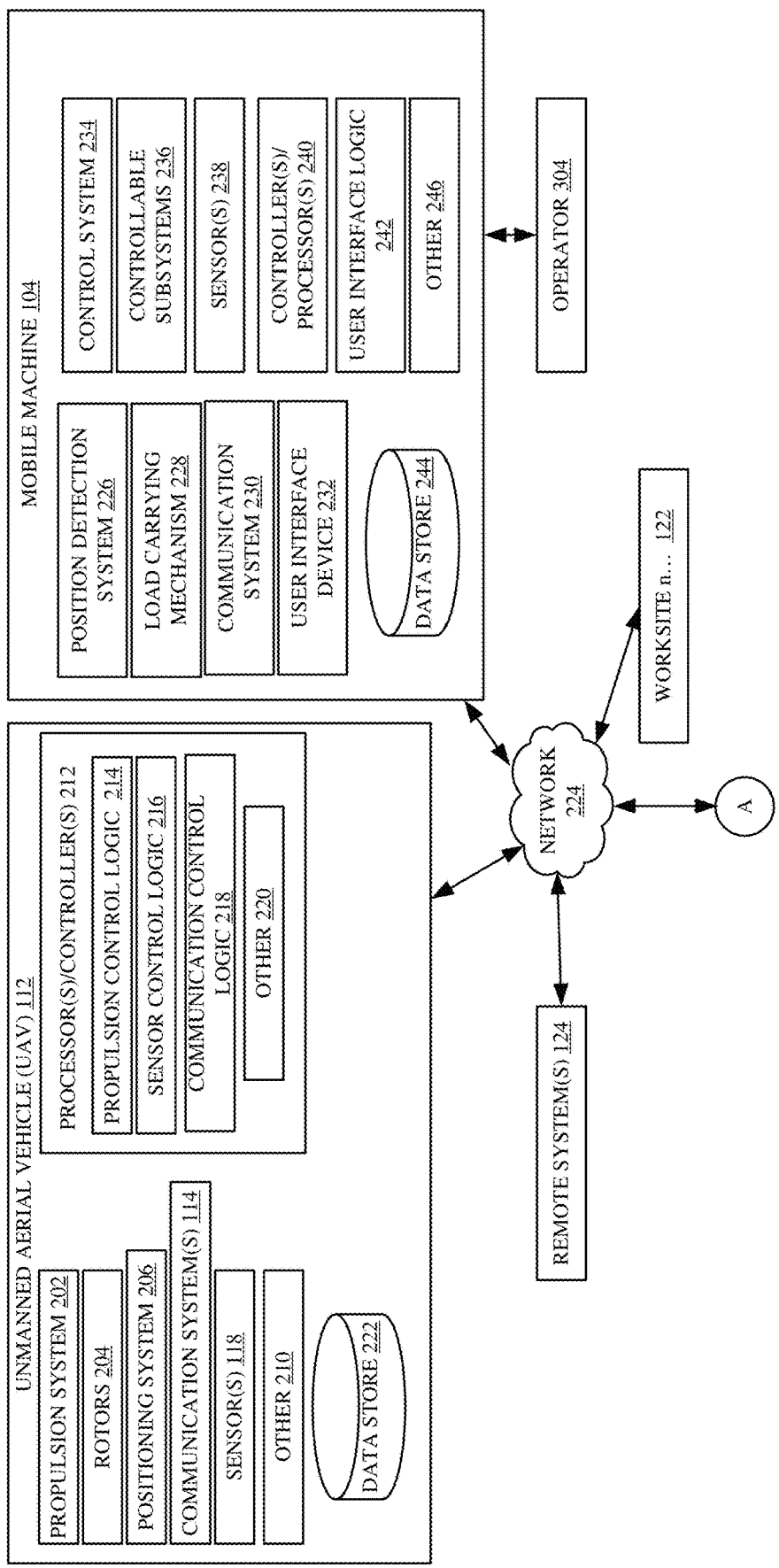
FIGS. 2A and 2B are block diagrams showing one example of a mobile machine, an unmanned aerial vehicle and a worksite control system of a worksite in more detail.
Figure 2B:
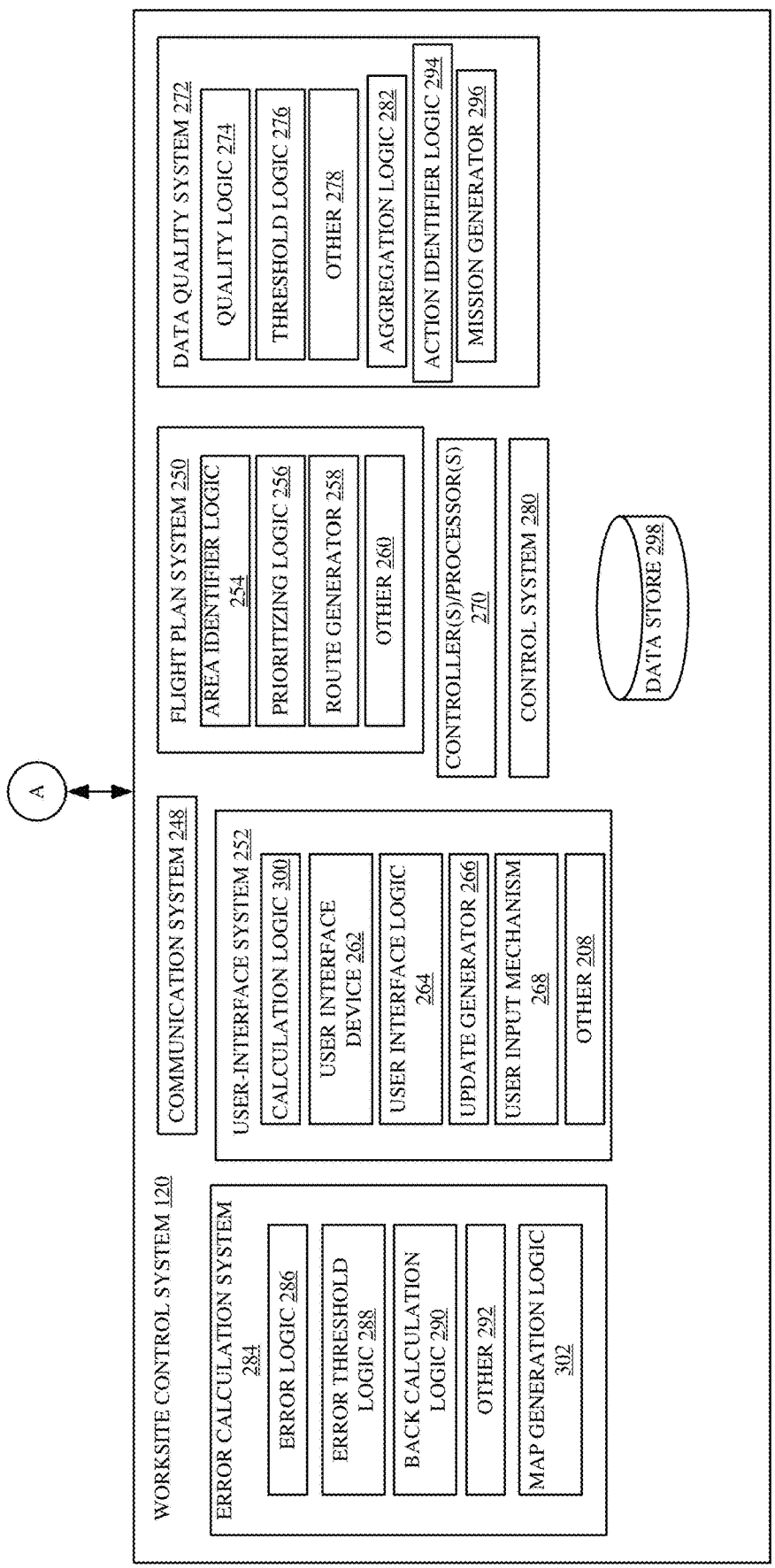

FIGS. 2A and 2B are block diagrams showing one example of mobile machine 104, unmanned aerial vehicle (UAV) 112 and worksite control system 120 of a worksite in more detail. While mobile machine 104 is illustratively shown in FIG. 2A, it is to be understood that mobile machine 104 could be any or all mobile machines 104 and 106, etc. Mobile machine 104 is configured to carry out a task in accordance with a worksite operation that, for example, may be leveling a worksite surface, moving material from one worksite area to a different worksite area, among other tasks. Network 224 can be any of a wide variety of different types of networks, such as a wide area network, a local area network, a near field communication network, a cellular network, or any of a wide variety of other networks or combinations of networks. Before describing the operation of worksite control system 120 in more detail, a brief description of some of the items in mobile machine 106 and UAV 112 will first be provided.

Mobile machine 104 illustratively includes a position detection system 226, a load carrying mechanism 228, a communication system 230, a user interface device 232, a data store 244, a control system 234, controllable subsystem(s) 236, sensor(s) 238, controller(s)/processor(s) 240, user interface logic 242 and a variety of other logic 246. Control system 234 can generate control signals for controlling a variety of different controllable subsystems 236 based on sensor signals generated by sensor(s) 238, based on feedback from remote system 124 or feedback from worksite control system 120, based on operator inputs received through user interface device 232, or it can generate control signals in a wide variety of other ways as well. Controllable subsystems 236 can include a wide variety of mechanical, electrical, hydraulic, pneumatic, computer implemented and other systems of mobile machine 104 that relate to the movement of the machine, the operation that is performed, and other controllable features.

Communication system 230 can include one or more communication systems that allow mobile machine 104 to communicate with remote system 124, UAV 112, worksite control system 120 and/or other machines at different worksites 122 over network 224. User interface device 232 can include display devices, mechanical or electrical devices, audio devices, haptic devices, and a variety of other devices. In one example, user interface logic 242 detects user inputs and generates an operator display on user interface device 232 which can include a display device that is integrated into an operator compartment of mobile machine 104, or it can be a separate display on a separate device that can be carried by operator 304 (such as a laptop computer, a mobile device, etc.). Load carrying mechanism 228 is configured to carry or move a load of material during operation of mobile machine 104 at a worksite. Position detection system 226 can be one or more of a global position system (GPS) receiver, a LORAN system, a dead reckoning system, a cellular triangulation system, or other positioning system. In one example, position detection system 226 is configured to associate signals obtained by sensor(s) 238 with a geospatial location, such as a location within a worksite.

Unmanned aerial vehicle (UAV) 112 illustratively includes propulsion system 202, rotors 204, communication system(s) 114, positioning system 206, sensor(s) 118, a data store 222, and processor(s)/controller(s) 212 which include propulsion control logic 214, sensor control logic 216, communication control logic 218, and a variety of other logic 220. It can have other items 210 as well. Propulsion system 202 illustratively powers rotors 204, or other mechanisms, to provide propulsion to UAV 112. Propulsion control logic 214 illustratively controls propulsion system 202. In doing so, it can illustratively control the direction, height, altitude, speed, and other characteristics of UAV 112.

Sensor(s) 118 illustratively sense one or more attributes of a worksite over which UAV 112 is traveling. For example, sensor(s) 118 can sense such things as plant size, plant height, topography information, a position of mobile machines, or any other information relating to a worksite operation. Sensor(s) 118 can thus be a wide variety of different types of sensors such as cameras, infrared cameras or other infrared sensors, video cameras, stereo cameras, LIDAR sensors, structured light systems, etc.

Sensor control logic 216 can illustratively control sensor(s) 118. Therefore, it can illustratively control when sensor readings are taken, and it can perform signal conditioning on the sensor signals, such as linearization, normalization, amplification, etc. It can also illustratively perform other processing on the signals, or the processing can be performed by controller(s)/processor(s) 270 of worksite control system 120, or the processing can be split between sensor control logic 216 and controller(s)/processor(s) 270.

Communication system(s) 114 illustratively communicate with worksite control system 120, mobile machine 104 and/or remote system(s) 124. It can communicate by a wired communication harness when the communication link is a physically tethered harness. It can also communicate through a wireless communication link. Communication control logic 218 illustratively controls communication system(s) 114 to communicate with worksite control system 120. It can communicate the sensor signals from sensor(s) 118, or it can communicate them after they are conditioned by sensor control logic 216. It can also communicate other values that are generated based on the sensors, or other items in UAV 112. For instance, it can communicate the position of UAV 112 identified by positioning system 206. It can also, for example, calculate a relative offset between the position of UAV 112 and the position of mobile machine 104, and communicate that value to worksite control system 120. It can control the communication of a wide variety of other values or signals between UAV 112 and worksite control system 120.

Positioning system 206 illustratively generates a position indicator, indicating a position of UAV 112. As with position detection system 226, positioning system 206 can be a GPS system, a cellular triangulation system, a dead reckoning system, or a wide variety of other types of systems.

Turning now to worksite control system 120, worksite control system 120 illustratively includes a communication system 248, controller(s)/processor(s) 270, a control system 280, a data store 298, flight plan system 250, user interface system 252, data quality system 272 and error calculation system 284. Flight plan system 250, in one example, is configured to generate a route for UAV 112, within a worksite, based on identified types and locations of worksite areas within a worksite. Flight plan system 250 illustratively includes area identifier logic 254, prioritizing logic 256, a route generator 258, and other logic 260. In one example, types of worksite areas within a worksite can be identified based on a position of landscape modifiers within the worksite. For example, area identifier logic 254 can receive an input from position detection system 226 of mobile machine 104, and can identify a geospatial location of mobile machine 104 within the worksite based on the received input. Based on a location of mobile machine 104 and other landscape modifiers, area identifier logic 254 can identify different locations and types of worksite areas. For example, a worksite area with a plurality of mobile machines can be identified as dynamic, meaning that they will likely change relatively often, while worksite areas with relatively few to no mobile machines can be identified as fixed, meaning that they will not likely change very often. Alternatively, locations of other landscape modifiers, such as rain or wind, for example, can be identified using other received inputs.

Based on the identified types and locations of worksite areas within a worksite, prioritizing logic 256 receives the output from area identifier logic 254 and prioritizes the worksite areas for UAV 112. For example, fixed worksite areas can have a lower priority relative to dynamic worksite areas, as the fixed worksite areas are not being altered by landscape modifiers and are thus less likely to undergo topographical change. However, a priority can be altered based on a received user input indicating a preference or a received indication of a particular worksite operation. Additionally, while multiple worksite areas can be identified as fixed or dynamic, they may have varying priority based on their respective location within a worksite. For example, a fixed worksite area located farther away from a UAV station may be given a higher priority relative to a fixed worksite area located closer to the UAV station, or vice versa. Additionally, types of worksite areas can be further prioritized based on a duration of time as either fixed or dynamic. For example, a recently identified fixed worksite area, corresponding to a worksite area that mobile machines 104 and 106 recently left, may have a higher priority compared to another fixed worksite area that was previously identified as fixed, and where it has had no machine activity for a longer time period. Similarly, dynamic worksite areas may be prioritized based on how quickly change is expected. For instance, a dynamic worksite area with multiple machines working on it may have a higher priority than one with fewer machines working on it.

Once the worksite areas are prioritized, route generator 258 is configured to generate a route for UAV 112 based on the prioritized worksite areas. In one example, upon generating a route, the route can be displayed to a user of worksite control system 120 on user interface device 262. Additionally, a user input can be received either accepting or rejecting the proposed route. In one example, if the proposed route is accepted, control system 280 generates control signals for UAV 112 to navigate based on the accepted route. Alternatively, control system 280 can also be configured to automatically generate control signals to UAV 112 after route generator 258 generates the route. Upon receiving the control signals from control system 280, UAV 112 can be configured to carry out a worksite mission along the route, which, in one example, includes obtaining topographical information and/or other information pertaining to a density, surface texture, soil moisture and/or soil type or worksite characteristic for worksite areas along the generated route.

While UAV 112 can be automatically configured to conduct a worksite mission based on received control signals from control system 280, in other examples, a user input is first required indicating certain operating and mission parameters for UAV 112. In one example, worksite control system 120 includes user-interface system 252 configured to generate a display for a user while being configured to receive a variety of user inputs indicating a vehicle control variable and/or field data pertaining to a worksite operation. In one example, user interface system 252 includes calculation logic 300, a user interface device 262, user interface logic 264, update generator 266, a user input mechanism 268 of user interface device 262, among other logic 208.

In one example, a variety of variables and information can be entered through user input mechanism 268 such as camera configuration information, field data information corresponding to a worksite, and mission planning variables which can include a planned altitude, planned horizontal speed and required vertical accuracy, among others. However, as will be discussed later with respect to FIGS. 4-5, user interface system 252 includes user interface logic 264 that generates a display, on user interface device 262, of architectural parameters, such as an imaging configuration of UAV 112 (focal length, lens angle, pixel size, etc.), operating parameters, such as altitude and horizontal speed, and nominal and actual vertical accuracy information, among other types of information. In one example, user input mechanism 268 allows a user to modify and enter variables corresponding to the displayed architectural parameters, operating parameters, and nominal and actual vertical accuracy information, in addition to other information, while calculating dependent values for the remaining variables using calculation logic 300. For example, based on the received user input through user input mechanism 268, calculation logic 300 can calculate dependent variables relating to the variables input by a user through user input mechanism 268, as will be discussed later.

Figure 6:
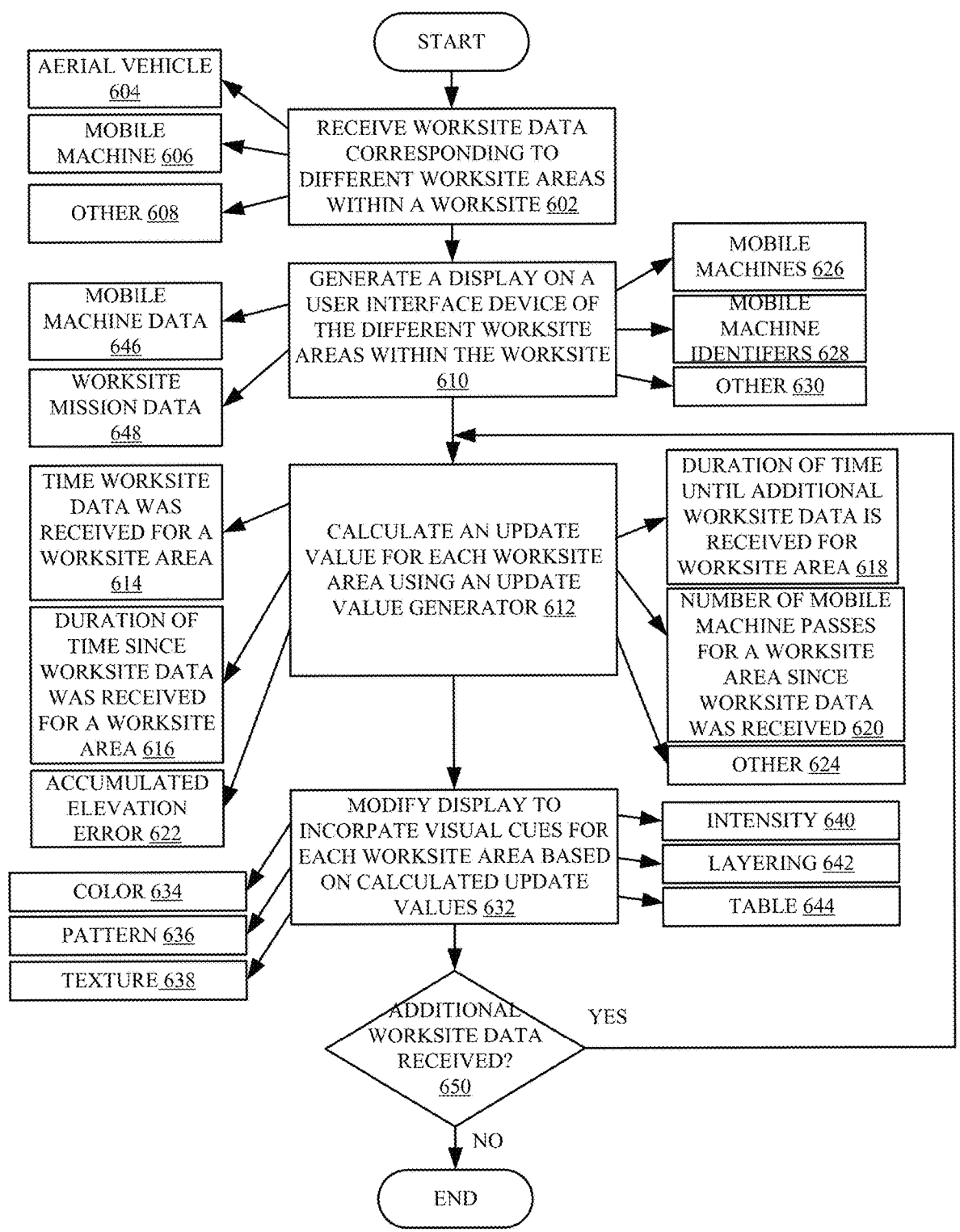
FIG. 6 is a flow diagram showing one example of generating a user interface with visual cues indicative of update values for different worksite areas within a worksite.

Additionally, in one example, user interface logic 264 is further configured to generate a display, on user interface device 262, of a worksite to a user along with visual cues indicative of a calculated spatio-temporal update value for a worksite area, as will be discussed with respect to FIGS. 6-8. Briefly, however, user interface logic 264 is configured to generate a worksite map display that includes a number of worksite areas. The worksite areas can be related based on displayed pixels, worksite data resolution, worksite equipment dimensions or any other suitable criteria. Additionally, in one example, each displayed worksite area can have a worksite attribute value associated with it such as an initial elevation, currently measured elevation, or current elevation deviation from a target elevation, among other attribute values.

Update generator 266, of user interface system 252, is configured to calculate update values for worksite areas displayed on user interface device 262. In one example, the update values can be indicative of a duration of time since worksite data was received for the worksite area, a duration of time until additional worksite data is received for the worksite area, a number of equipment passes that have taken place at the worksite area or accumulated elevation error since worksite data was obtained.

Based on the calculated updated values by update generator 266, user interface logic 264 can control user interface device 262 to generate visual cues on user interface device 262 indicative of the calculated updated values. For example, user interface logic 264 can alter a display of the worksite areas by incorporating different colors, patterns, textures, and/or intensities of the worksite areas, among other display characteristics, indicative of the calculated update values. Additionally, in one example, the display can further include a position of mobile machine 104 and UAV 112 at a worksite, in addition to attributes of mobile machine 104 and UAV 112. By displaying visual cues indicative of the calculated spatio-temporal update values, a manager of a worksite operation can effectively track a productivity of mobile machines at a worksite, along with a progress of a worksite operation or freshness of worksite data.

Worksite control system 120 also illustratively includes data quality system 272 configured to monitor a quality of worksite data received from mobile machine 104 and UAV 112, among other worksite machines. Data quality system 272 includes quality logic 274, threshold logic 276, aggregation logic 282, action identifier logic 294, a mission generator 296, among other logic 278. In one example, data quality system 272 is configured to receive worksite data from mobile machine 104 and/or UAV 112, using communication system 248, and monitor a quality of the received worksite data. Based on a quality of the received worksite data, control signals can be generated and sent to a mobile machine(s) at the worksite.

Quality logic 274, in one example, is configured to receive an indication of worksite data, and calculate a quality of the received worksite data based on quality data within the received worksite data. Quality data can include any worksite data that allows quality logic 274 to determine a quality of the worksite data. As an example, the present disclosure will now assume that data quality system 272 receives worksite data from UAV 112, even though it is assumed that data quality system 272 can receive worksite data from a variety of sources. In this example, UAV 112 can include sensor(s) 118 which can include a pose sensor, an accelerometer, a camera, an ambient sensor, a global navigation satellite system (GNSS), among other components. Sensor(s) 118 can sense a variety of parameters from which quality data can be obtained. For example, quality data from sensor(s) 118 can include horizontal dilution of precision (HDOP) data and vertical dilution of precision (VDOP) data from GNSS, pitch, roll and yaw data from a pose sensor, x-axis, y-axis and z-axis data from an accelerometer, shutter speed and aperture data from an image capture system, weather and obscurant data from an ambient sensor, and for worksite activity data from a variety of sensors, among other data.

From the obtained quality data from UAV 112, quality logic 274 can determine a quality of the worksite data. Additionally, worksite data quality can be a single value or a vector of values. For example, shutter speed and accelerometer data from UAV 112 can be combined for a pixel blur quality metric. In one example, aggregation logic 282 can be used to aggregate the worksite data corresponding to a multitude of measurements or received data from a plurality of mobile machines located within a worksite.

Upon calculating a data quality value for the received worksite data from UAV 112, threshold logic 276 can compare the calculated data quality to a quality threshold, and, based on the comparison, action identifier logic 294 can determine an improvement action. In one example, a data quality threshold can be specific to a worksite operation. Additionally, it is expressly contemplated that a data quality threshold can be adjusted based on a received user input through user input mechanism 268. As such, a data quality threshold can be variable or fixed. Regardless, based on a comparison of the data quality value to the threshold, worksite areas with deficient worksite data can be identified and assigned an improvement action.

In one example, a comparison of the data quality value to the data quality threshold can indicate a variety of data quality issues, which, in one example, can include a presence of a wind gust with an "open" camera shutter, surface lidar point cloud variation, vegetation within a worksite area, or a presence of an obscurant, among other things. Action identifier logic 294 can, based on the comparison of the data quality to the data quality threshold, determine an improvement action for a worksite area from which the worksite data was received. Improvement actions, in one example, can include UAV 112 flying back to the worksite area and obtaining additional worksite data for a worksite area, or mobile machine 104 traveling to the worksite area and obtaining additional worksite data to supplement the received worksite data. Additionally, an improvement action can include landing UAV 112 and obtaining ground control point data for the worksite area. Alternatively, sensor(s) 118 on UAV 112 can be used to assess a height of vegetation, which, in turn, can be used as a correction measurement for the worksite data. Furthermore, in an example in which an obscurant is detected resulting from weather, an improvement action can include waiting a defined time period for the weather to clear. However, it is contemplated that these and/or a variety of other improvement actions can be determined to supplement the deficient worksite data.

Once action identifier logic 294 identifies an improvement action for a worksite area, mission generator 296 can either update a current mission of UAV 112, so that UAV 112 is configured to execute the improvement action by obtaining additional worksite data as part of a current mission, or create a new mission for UAV 112 to obtain additional worksite data. Upon mission generator 296 creating or updating a worksite mission, control system 280 can generate control signals to control UAV 112 based on the updated or created worksite mission. In one example, by updating or creating a worksite mission for UAV 112 or mobile machine 104 based on a quality of data, a progress for a worksite operation can be effectively and accurately monitored, as well as a productivity of mobile machine 104. Additionally, it is contemplated that control signals can also be generated for a multitude of UAVs or mobile machines based on available fuel, proximity to where data needs to be collected, UAV or sensor health, types of sensor(s) on-board, or any other additional criteria in order to obtain additional worksite data to supplement the initial worksite data.

Additionally, a productivity of ground-engaging mobile machines often involves determining an amount of material moved by the ground-engaging mobile machines at a worksite area. However, determining an accurate productivity is often made difficult through an introduction of error from measurement errors, blade side material loss effects and track effects, among other things. As illustratively shown, in one example, worksite control system 120 includes error calculation system 284 configured to determine a worksite error accumulated over a multitude of passes by ground-engaging mobile machines at a worksite area, and, based on the determined error, generate control signals to UAV 112 to conduct a worksite mission. In one example, a worksite mission can include conducting a high accuracy aerial or ground survey of the worksite area to obtain highly accurate data regarding the worksite area. As illustratively shown, error calculation system 284 includes error logic 286, error threshold logic 288, back calculation logic 290, map generation logic 302, and other logic 292.

In one example, error logic 286 is configured to receive worksite data from ground-engaging mobile machines and determine a worksite error. As an example, the present disclosure will now assume that error calculation system 284 receives worksite data from mobile machine 104, even though it is assumed that error calculation system 284 can receive worksite data from a variety of sources. Additionally, for clarification, it will be assumed that mobile machine 104 is a ground-engaging mobile machine tasked with leveling a particular worksite area, even though it is contemplated that mobile machine 104 can be another type of mobile machine tasked with a different worksite task.

In this example, as mobile machine 104 makes passes altering a worksite surface, mobile machine 104 generates worksite data and provides the worksite data to error logic 286. Worksite data can include georeferenced grader blade data, material data and/or material quality data. Additionally, worksite data can be combined with additional worksite data such as soil type, compaction and/or moisture content, etc. Worksite data can be generated from sensor(s) 238 which can include strain gauges, optical sensors, ultrasound sensors, pressure sensors, scales, among other types of sensors. Additionally, sensor(s) 238 can include a real time kinematic (RTK) global positioning system that allows ground-engagement components, such as a blade or roller, of mobile machine 104 to be tracked with a high precision.

Upon receiving worksite data, a worksite error can be calculated by error logic 286 in a variety of ways, either alone or in combination, using the worksite data. For example, a worksite error can be calculated by comparing an estimate of material moved by a machine to an optical measurement of material relative to a ground engaging component of mobile machine 104, an acoustic measurement of material relative to mobile machine 104, error modeling which can include a variety of parameters such as a ground engaging component type, operating angle, weight, material type, material moisture, etc., GPS error estimates, operator observations, or sensor fusion information in combination with a kinematic model of the mobile machine.

Error threshold logic 288 compares the calculated worksite error to a threshold value, and, based on the comparison, control signals can be generated to UAV 112 to conduct a worksite mission to address the worksite error. In one example, a worksite mission can include obtaining topographical information for a worksite area which can indicate an accurate amount of material moved within the worksite area. Assuming a calculated worksite error is greater than a threshold value so that additional worksite data is to be obtained using UAV 112, back calculation logic 290 is configured to generate an updated productivity for mobile machine 104 based on the additional worksite data. Additionally, back calculation logic 290 can receive the additional worksite data and back-allocate the error to individual passes made by mobile machine 104. A corrected productivity can be displayed to a user on user interface device 262.

Additionally, error calculation system 284 includes map generation logic 302 configured to generate a worksite error map based on a difference between a first worksite state map, generated from worksite data obtained from ground-engaging mobile machines, and a second worksite state map, generated from worksite data obtained from a UAV, as will be discussed below with respect to FIG. 11. In one example, a worksite state map includes topography information, density information, a surface texture, soil moisture and soil type, among other types of worksite data for a given worksite area. A worksite error map can be displayed on user interface device 262, along with any received worksite data.

Worksite control system 120 also illustratively includes data store 298 that can be used to store any worksite data or information obtained from mobile machine 104, UAV 112, among other sources. The worksite data can be indexed within data store 298 in a variety of ways. For example, indexing criteria can include indexing the data based on the type of mobile machine corresponding to the data, UAV that gathered it, a time at which the data was obtained, among other criteria. Any or all of the data can also be displayed on user interface device 262 using user interface logic 264.

Figure 3:
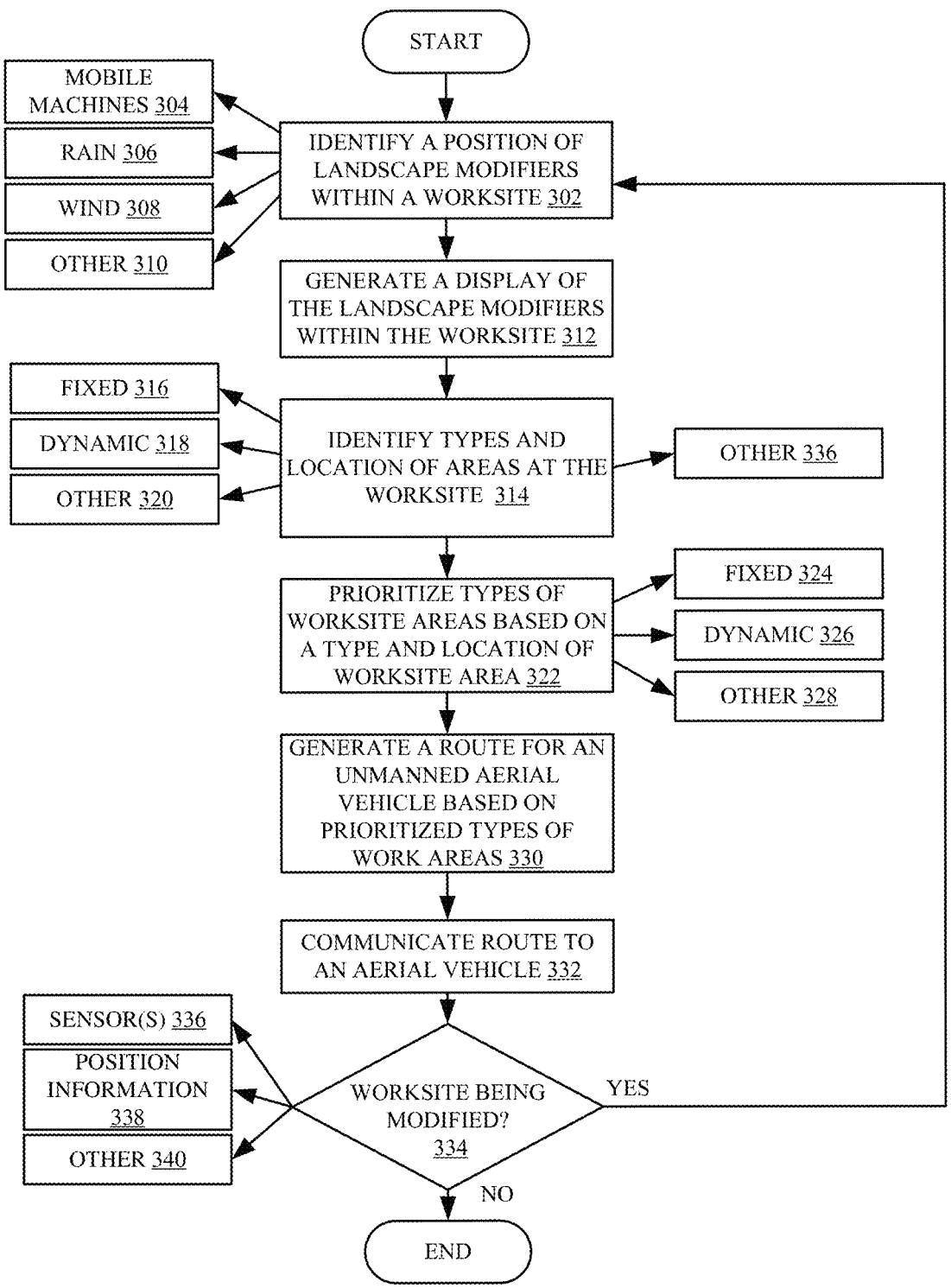
FIG. 3 is a flow diagram showing one example of generating a route for a UAV using a worksite control system illustrated in FIG. 2.

FIG. 3 is a flow diagram showing one example of generating a route for a UAV using a worksite control system illustrated in FIG. 2. As illustratively shown, processing begins at block 302 where positioning data is received from landscape modifiers at a worksite and used to identify a location of the landscape modifiers within the worksite. While landscape modifiers can include mobile machines, as indicated by block 304, landscape modifiers can also include rain, as indicated by block 306, and/or wind as indicated by block 308. In one example, positioning data is generated from position detection system 226 within mobile machine 104. Additionally, positioning information can be obtained from sensor(s) 238 which can include optical sensors, weather sensors, etc. However, any worksite data corresponding to a location of landscape modifiers can be used to identify a location of the landscape modifiers within a worksite as indicated by block 310.

Processing proceeds to block 312 where a display is generated on user interface device 262 of the landscape modifiers and their position using user interface logic 264. However, it is expressly contemplated that a display can be rendered at any point during the processing or not rendered at all.

Based on a location of landscape modifiers within a worksite, types of worksite areas and their respective locations are determined using area identifier logic 254, as indicated by block 314. In one example, identified types of worksite areas can include fixed worksite areas as indicated by block 316, dynamic worksite areas as indicated by block 318, or any other type of worksite area as indicated by block 320. Furthermore, it is contemplated that types of worksite areas and their respective locations can be identified in other ways as well, as indicated by block 336.

Prioritizing logic 256 then prioritizes the worksite areas, as indicated by block 322. In one example, the types of worksite areas can be prioritized based on type, as indicated by block 324, their location within a worksite as indicated by block 326, or any other criteria as indicated by block 328.

Based on the prioritized types of worksite areas, a route is determined for an unmanned aerial vehicle using route generator 258, as indicated by block 330. The route can be transmitted to the UAV using communication system 248 as indicated by block 332. Upon receiving the route, the UAV can be automatically configured to conduct a worksite mission based on the received route, and/or a user input can be received either accepting or rejecting the identified route. Processing then turns to block 334 where a determination is made by area identifier logic 254 as to whether a worksite is being modified by landscape modifiers. In one example, a determination can be based on received information from sensor(s) 238 on mobile machine 104, as indicated by block 336. Alternatively, a determination can be based on received position information from position detection system 226, as indicated by block 338, indicating that mobile machine 104 has moved within a worksite. However, any other information may be used to determine whether a worksite is currently being modified, as indicated by block 340. If area identifier logic 254 determines a worksite is currently being modified, processing proceeds back to block 302 where a position of landscape modifiers within a worksite is identified. Alternatively, if a worksite is not currently being modified, the processing ends.

Figure 4:
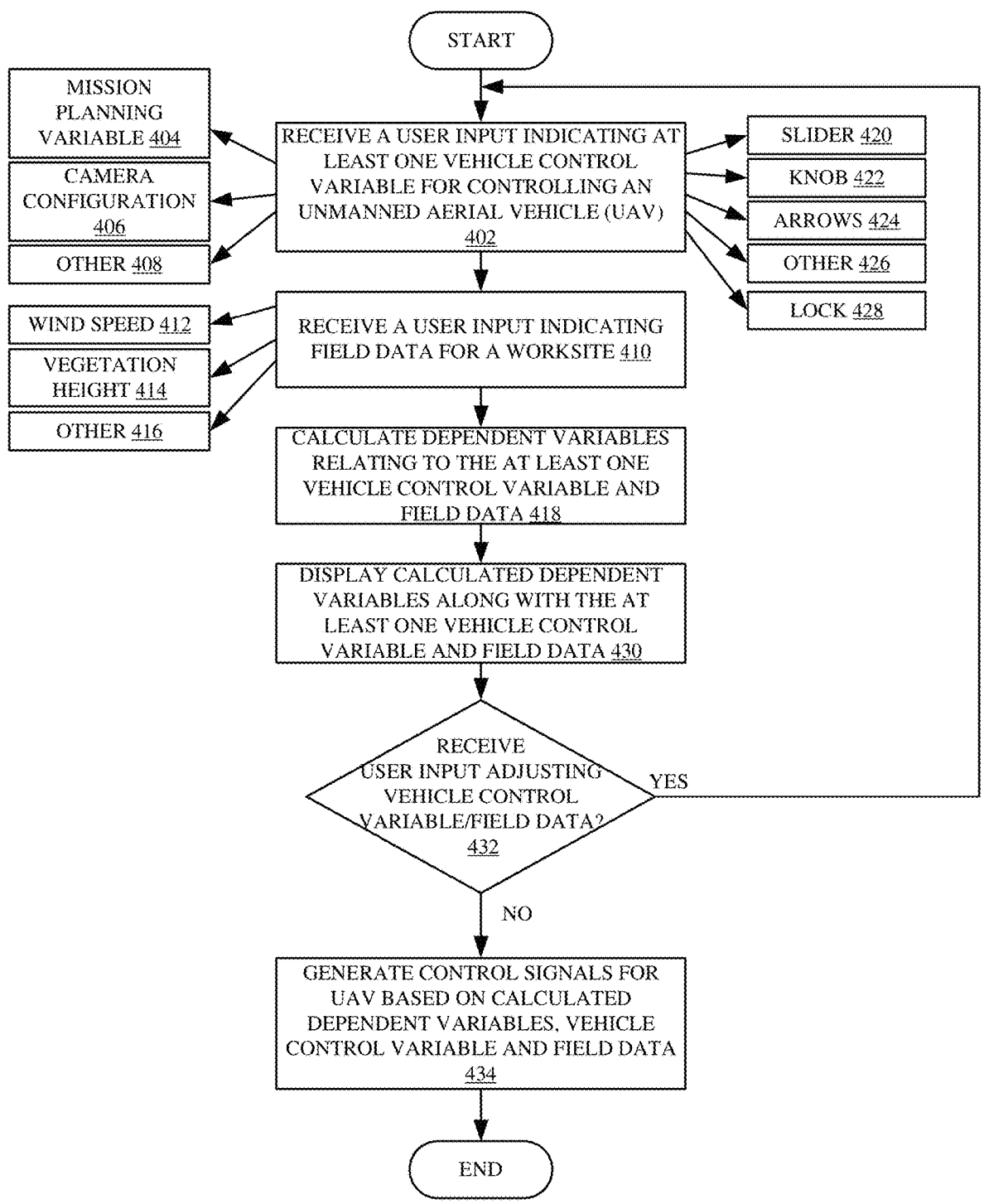
FIG. 4 is a flow diagram showing one example of setting operating parameters for a UAV using a worksite control system illustrated in FIG. 2.

FIG. 4 is a flow diagram showing one example of setting operating parameters for a UAV using a worksite control system illustrated in FIG. 2. Processing begins at block 402 where a user input is received indicating at least one vehicle control variable for controlling unmanned aerial vehicle (UAV) 112, as indicated by block 402. In one example, the at least one vehicle control variable includes a mission planning variable, as indicated by block 404, a camera configuration, as indicated by block 406, among other variables as indicated by block 408. In one example, the at least one vehicle control variable can be received through user input mechanism 268 which can include a slider displayed on user interface device 262, as indicated by block 420. Additionally, the user input mechanism can include a knob, as indicated by block 422, arrows, as indicated by block 424, among other types of user inputs mechanisms as indicated by block 426. Further, a user input can include a locking user input that locks the at least one vehicle control variable so that the selected values of the variable(s) remain fixed, as indicated by block 428.

Processing then proceeds to block 410 where a user input is received indicating field data for a worksite. In one example, the field data includes a wind speed at a worksite, as indicated by block 412, a vegetation height, as indicated by block 414, among other field data as indicated by block 416. Upon receiving at least one vehicle control variable and field data, processing then proceeds to block 418 where calculation logic 300 calculates dependent variables relating to the at least one vehicle control variable and field data. In one example, the calculated dependent variables can be calculated based on mathematical relationships amongst the entered data, and can depend on what particular variables and field data are received by a user as will be discussed further below with respect to FIG. 5.

However, upon calculating dependent variables relating to the at least one vehicle control variable and field data, processing turns to block 430 where a display is generated by user interface logic 264 and is displayed on user interface device 262. In one example, the display includes the at least one vehicle control variable, field data and calculated dependent variables relating to UAV 112. However, it is expressly contemplated that only some of the information may be displayed, such as the calculated dependent variables relating to the at least one vehicle control variable and field data. Processing then turns to block 432 where a user input can be received through user input mechanism 268 adjusting the at least one vehicle control variable and/or field data.

If a user input is received adjusting the at least one vehicle control variable and/or field data, processing proceeds back to block 418 where dependent variables are calculated by calculation logic 300 based on the adjusted at least one vehicle control variable and/or field data. However, if no user input is received adjusting the at least one vehicle control variable and/or field data, processing proceeds to block 434 where control signals are generated by control system 280 to UAV 112 based on the at least one vehicle control variable, field data, and calculated dependent variables. In one example, UAV 112, upon receiving the control signals, is configured to carry out a worksite mission in accordance with the at least one vehicle control variable, field data and calculated dependent variables. The worksite mission can correspond to obtaining topographical information, a position of landscape modifiers, among other information.

Figure 5:
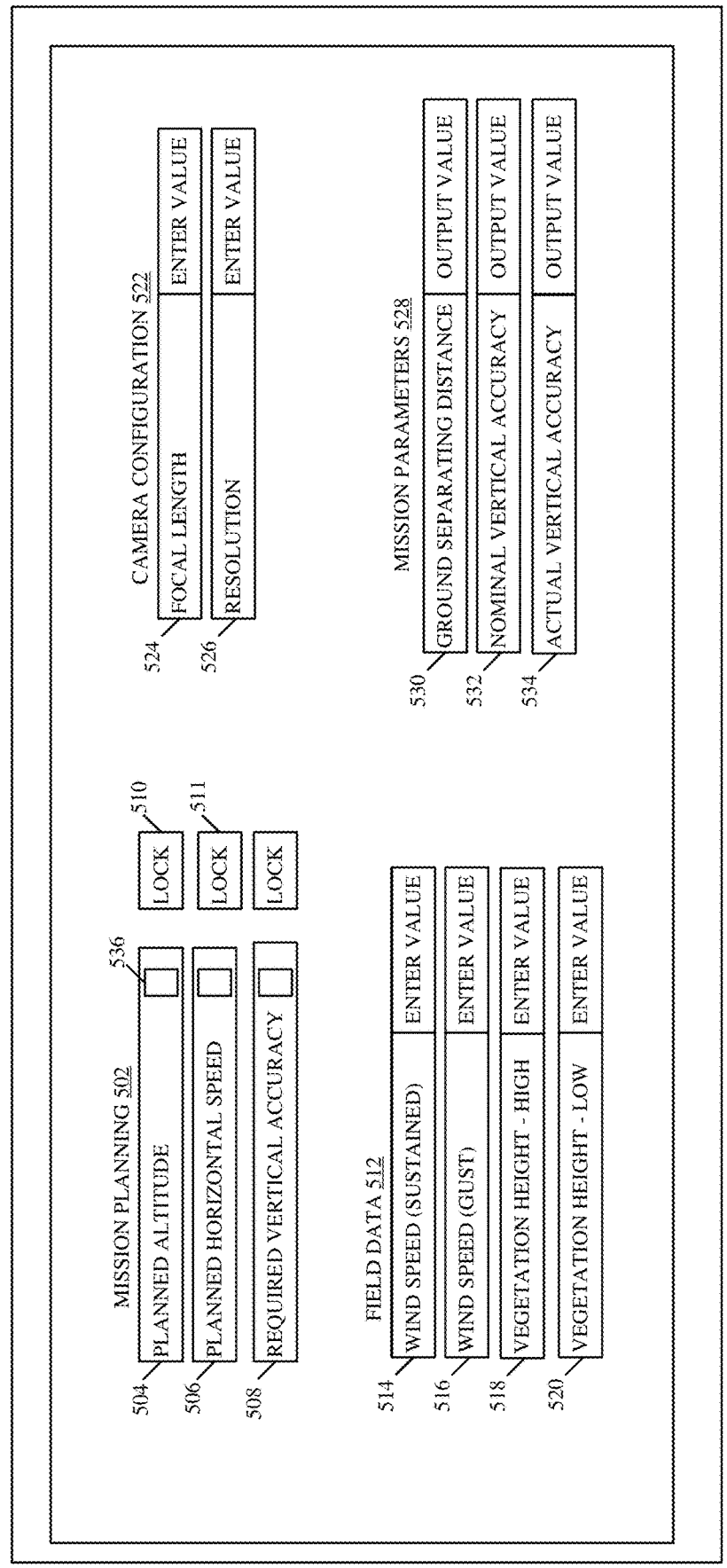
FIG. 5 is one example of a user interface display for setting UAV parameters.

FIG. 5 is one example of a user interface display 500 for setting UAV parameters. In one example, the user interface display is generated by user interface logic 264 on user interface system 252 of worksite control system 120. User interface display 500 illustratively includes mission planning variables 502, field data 512, camera configuration information 522 and mission parameters 528. Mission planning variables 502 can include a user-actuatable planned altitude display element 504, a user-actuatable planned horizontal speed display element 506 and a user-actuatable required vertical accuracy display element 508, among other elements, configured to receive a user input indicative of a desired value. In one example, mission planning variables 502 can be adjusted based on a received user input through a user input mechanism such as a slider 536 displayed on a user interface display. Additionally, any or all of mission planning variables 502 can be locked in response to a received user input, such as by actuating user input mechanism 510 and/or 511.

Camera configuration information 522 illustratively includes a user-actuatable focal length display element 524 and a user-actuatable resolution display element 526, among other information, configured to receive a user input indicative of a focal length and a resolution value (e.g. cm^2/pixel) for an image acquisition system of UAV 112. In one example, camera configuration information 522 can be fixed based on an image acquisition system within UAV 112. However, camera configuration information 522 can also vary based on the type of UAV 112 and equipment within UAV 112. Field data 512 can include a user-actuatable sustained wind speed display element 514, a user-actuatable wind speed gust display element 516, a user-actuatable high vegetation height display element 518 and a user-actuatable low vegetation height display element 520, among other data, for worksite area 100. In one example, field data 512 can depend on a type of worksite and a desired location of a worksite area for which a worksite mission is to be conducted. In another example, wind speed display element 514 and wind speed gust element 516 may be pre-populated with recent data from a weather station via network 224.

Mission parameters 528 illustratively include a ground separating distance display element 530, a nominal vertical accuracy display element 532 and an actual vertical accuracy display element 534 configured to output calculated values by calculation logic 300. One example of inputting at least one vehicle control variable and field data will now be discussed for UAV 112, even though it is to be understood that a wide variety of different variables and information can be used.

In one example, a received user input can set user-actuatable planned horizontal speed display element 506, using slider 536, at 15 m/s, and that value can be locked by actuating lock mechanism 511. Camera configuration information 522 can then be input, such as by entering values for user-actuatable focal length display element 524 and user-actuatable resolution display element 526 based on a type of image acquisition system within UAV 112. Camera configuration information 522 can also be prepopulated in user interface display 500. A user can then enter a value for user-actuatable vertical accuracy display element at 1 cm, using a slider. Based on the variables and information received, calculation logic 300 determines a user-actuatable planned altitude display element 504 to be 45 m (148 ft) using mathematical interrelationships between the variables and data. Additionally, calculation logic 300 determines a nominal vertical accuracy display element 532 to be 0.8 cm and a ground separating distance display element 530 to be 0.4 cm. The calculated values can then be displayed to a user in fields 504, 532 and 530, and control signals are then generated and used to control UAV 112 based on the values.

In one example, when a user modifies one of the sliders 536 for mission planning variables 502, the remaining sliders automatically adjust based on a real-time calculation of the dependent variables in accordance with a mathematical model of the interrelationships between the independent and dependent variables. Whether one of the mission planning variables 502 is independent or dependent depends on a received user input at any given time. For instance, a received user input locking user-actuatable planned horizontal speed display element 506 at 15 m/s, by actuating lock mechanism 511, indicates that a planned horizontal speed is to be an independent variable for purposes of calculating vehicle control variables and information. In this example, a user can leave user-actuatable planned altitude display element 504 and user-actuatable required vertical accuracy display element 508 unlocked, indicating they are to be dependent variables. Additionally, a received user input can lock any of variables 502 to indicate that they are independent variables for purposes of calculating the remaining variables.

In addition to setting operating parameters for an unmanned aerial vehicle, a user interface can also display different worksite areas and visual cues indicative of a "freshness" of received worksite data for the different worksite areas. FIG. 6 is a flow diagram showing one example of generating a user interface with visual cues indicative of update values for different worksite areas within a worksite. Processing begins at block 602 where worksite data is received from mobile machines located at various worksite areas. In one example, worksite data is received from unmanned aerial vehicle 112, as indicated by block 604. Additionally, worksite data can be received from mobile machine 104, as indicated by block 606, and a variety of other sources as indicated by block 608. In one example, worksite data can correspond to topographical information, mobile machine information, or any other information pertaining to a worksite.

Upon receiving worksite data, processing proceeds to block 610 where a display is generated on user interface device 262. In one example, the generated display can include mobile machine data, as indicated by block 646, and worksite mission data as indicated by block 648. Additionally, the user interface display can also include a position of mobile machines, as indicated by block 626, mobile machine identifiers, as indicated by block 628, among other data as indicated by block 630, within a worksite.

Processing turns to block 612 where an update value is calculated by update generator 266 for the displayed worksite areas based on received worksite data. In one example, an update value can be calculated based on a time that worksite data was received for a worksite area, as indicated by block 614. Additionally, an update value can be calculated based on a duration of time since worksite data was received for a worksite area, as indicated by block 616, a duration of time until additional worksite data is received for a worksite area, as indicated by block 618, and/or a number of mobile machine passes at a worksite area since worksite data was received, as indicated by block 620. However, an update value can be calculated in a variety of other ways, as indicated by block 624.

Upon calculating an update value for worksite areas, processing continues at block 632 where control signals are generated by user interface logic 264 for user interface device 262 to display visual cues indicative of the calculated update values. In one example, displayed visual cues can include a change in color, as indicated by block 634, pattern, as indicated by block 636, texture, as indicated by block 638, intensity, as indicated by block 640, layering, as indicated by block 642, as well as a table as indicated by block 644. In one example, by incorporating visual cues on the user interface display, a user can accurately determine a worksite productivity along with a progress in completing a worksite goal. In another example, the visual cues enable a user to assess data currency for different worksite areas. Processing then proceeds to block 650 where a determination is made whether additional worksite data is received. If additional worksite data is received, processing proceeds back to block 612 where an update value is calculated for a worksite area in which additional worksite data is received. If additional data is not received, processing subsequently ends.

Figure 7:
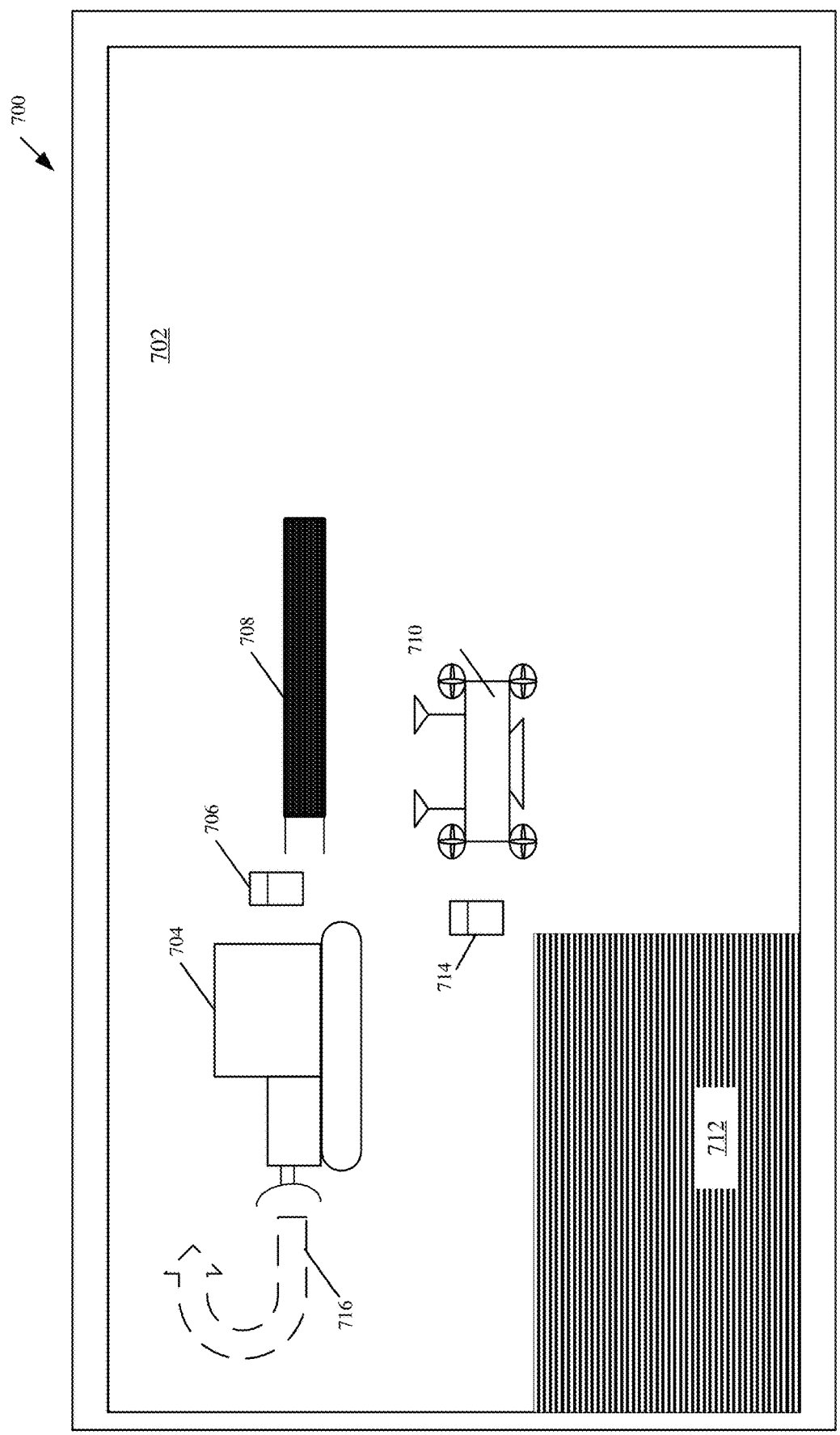
FIG. 7 is one example of a user interface display for displaying worksite areas within a worksite and corresponding visual cues indicative of update values for the respective worksite areas.
Figure 8:
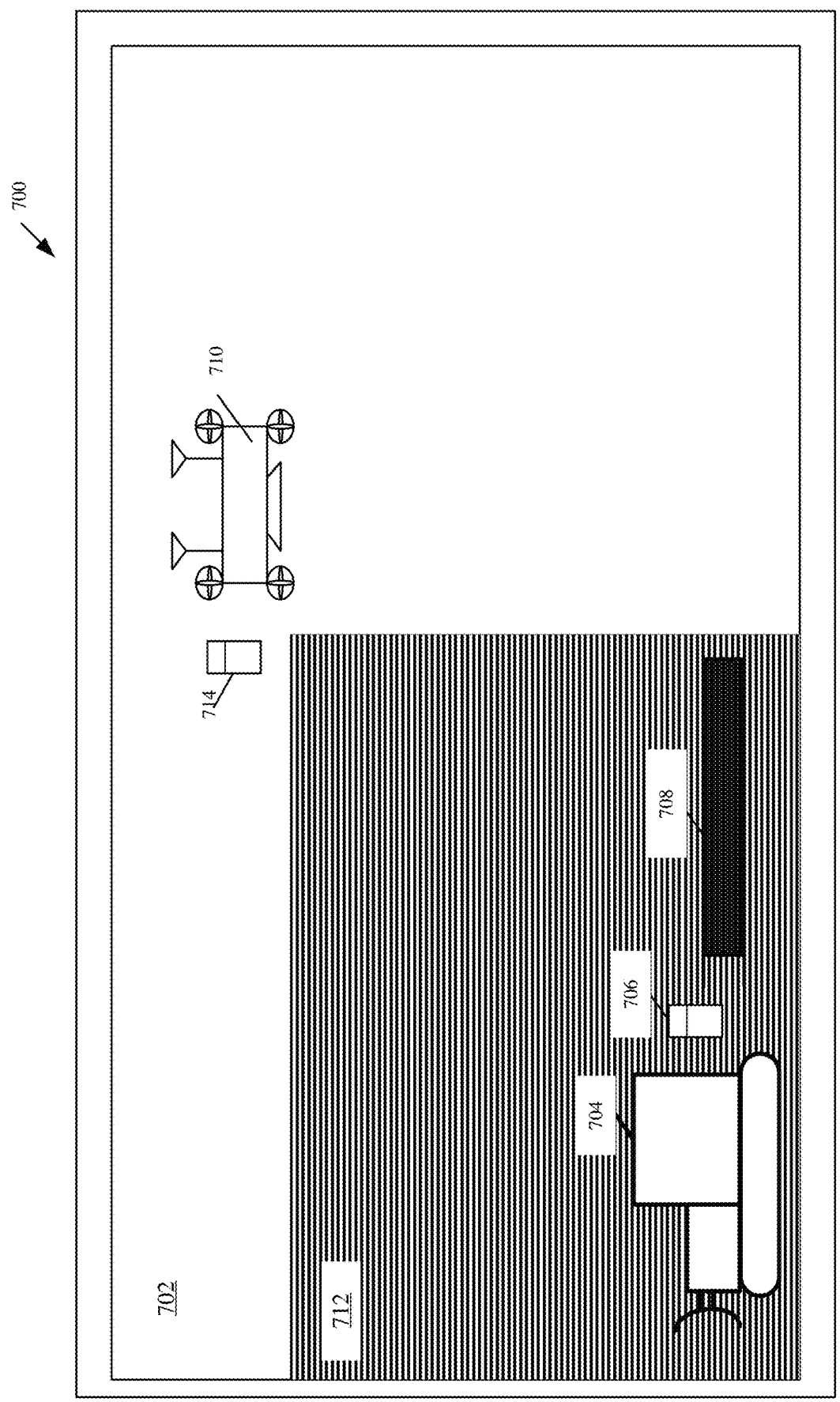
FIG. 8 is another example of a user interface display for displaying worksite areas within a worksite and corresponding visual cues indicative of update values for the respective worksite areas.

FIG. 7 is one example of a user interface display for displaying worksite areas within a worksite and corresponding visual cues indicative of update values for the respective worksite areas. In one example, a user interface display can be displayed on user interface device 262 using user interface logic 264. User interface display 700 includes an unmanned aerial vehicle (UAV) display element 710 configured to display a UAV within a worksite 702, a UAV characteristic display element 714 configured to display a characteristic of the UAV, a mobile machine display element 704 configured to display a mobile machine within worksite 702, and a mobile machine characteristic display element 706 configured to display a characteristic of the mobile machine within worksite 702. In one example, mobile machine display element 704 and UAV display element 710 correspond to UAV 112 and mobile machine 104 configured to obtain worksite data within a worksite. Additionally, as illustratively shown, user interface display 700 includes a first worksite area display element 708, a second worksite area display element 712 and a path display element 716, which will be discussed below.

Received worksite data from mobile machine 104 can include elevation data of a blade as it passes over the worksite. Additionally, worksite data received from UAV 112 can correspond to topographical information from photogrammetry. As worksite data is received from mobile machine 104 and UAV 112, update values are calculated by update generator 266 based on the worksite data obtained from mobile machine 104 and UAV 112. In one example, a calculated update value by update generator 266 can be based on how recently mobile machine 104 and UAV 112 have collected and transmitted worksite data for a worksite area. Additionally, a calculated update value by update generator 266 can be indicative of mobile machine 104 and/or UAV 112 transmitting the worksite data. Based on the update value, visual cues are generated by user interface logic 264 and displayed by the first worksite area display element 708 and second worksite area display element 712 corresponding to a "freshness" of worksite data obtained for the worksite areas. As illustratively shown, visual cues for a worksite area can include a pattern change based on a type of mobile machine communicating the worksite data. However, other visual cues can be displayed as well.

In one example, a visual cue can correspond to an intensity or greyscale on user interface display 700. For example, in the situation a user interface display has intensity values ranging from 0 (black) to 1 (white), a 1 can be assigned to a work area that has just been updated while a 0 can be assigned to a work area that has not been updated since a selected start time (e.g. day, project phase, whole project, etc.) A function is used by user interface logic 264 to interpolate intermediate values such as a linear interpolation, an exponential decay interpolation, or any other suitable function. A visual cue can also be a color. In this example, color scales can be used such as green for recently updated and red for overdue, updating or never updated worksite data for a worksite area.

A visual cue can also be a pattern, texture, etc. In this example, a table can be used to look up data ranges. Ranges can be given specific patterns such as dots or lines, while dot intensity can be proportional to a value range. Layering can also be used as newer worksite data can be overlaid over older worksite data or layer on user interface display 700. For example, a display can be shown with original worksite data at the lowest or base level, worksite data from a UAV mission, overlaid, on top of the worksite data, at an intermediate layer, and worksite data from a mobile machine currently operating can be displayed over the top of the other data, as the highest layer.

User interface display 700 also illustratively includes path display element 716 that displays a current path of mobile machine 104 within a worksite. In one example, a current path of mobile machine 104 can be determined based on worksite data obtained from mobile machine 104, which can include positioning data from position detection system 226 for example. In this example, a user can then monitor a worksite operation as mobile machine 104 and UAV 112 collect worksite data. Additionally, while UAV characteristic display element 714, shown in FIG. 7, corresponds to a battery indication, and mobile machine characteristic display element 706 corresponds to a fuel level, a wide variety of other characteristics can be displayed as well. FIG. 8 is another example of a user interface display for displaying worksite areas within a worksite and corresponding visual cues indicative of update values for the respective worksite areas. In the illustrated example, a visual cue 712 corresponding to worksite data obtained from UAV 112 is overlaid over an initial worksite data layer 702, while a visual cue 708 is overlaid over visual cue 712 corresponding to more recent worksite data being received from mobile machine 104 at a worksite area. Additionally, it is contemplated that other visual cues can be displayed as well.

Figure 9A:
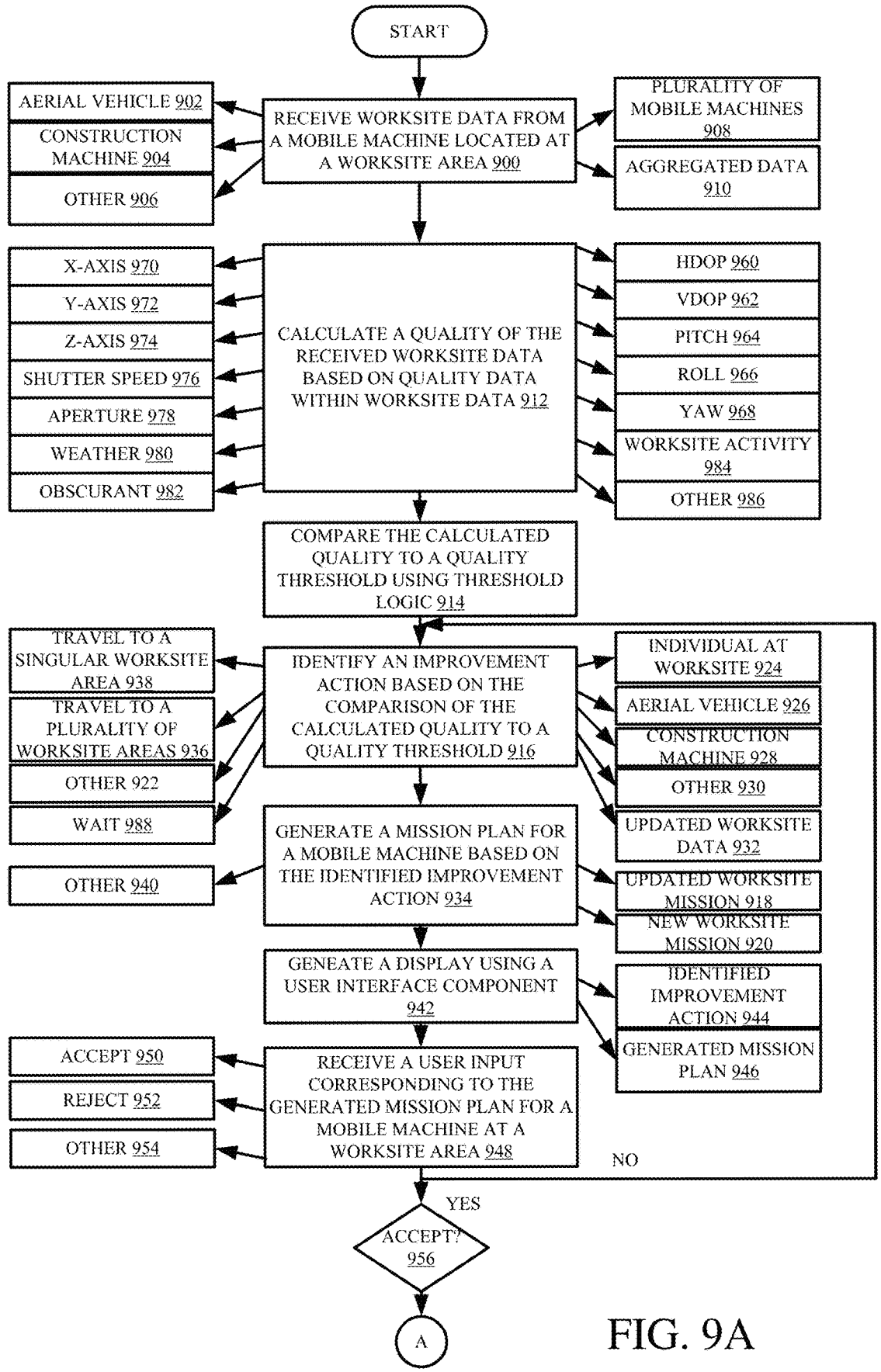
FIGS. 9A and 9B illustrate a flow diagram showing one example of calculating a worksite data quality metric from mobile machines at a worksite and obtaining additional worksite data based on the worksite data quality metric.
Figure 9B:
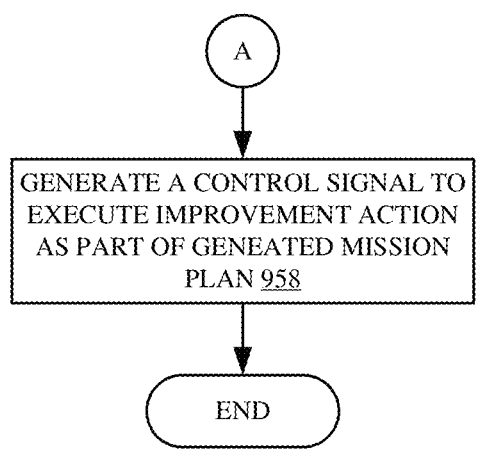

FIGS. 9A and 9B illustrate a flow diagram showing one example of calculating a worksite data quality metric from mobile machines at a worksite and obtaining additional worksite data based on the worksite data quality metric. Processing begins at block 900 where worksite data is retrieved through a communication system(s) of a mobile machine configured to carry out a worksite operation. In one example, a mobile machine can be UAV 112, as indicated by block 902, mobile machine 104, as indicated by block 904, or other sources as indicated by block 906. Additionally, worksite data can be received from a plurality of mobile machines, as indicated by block 908, and further aggregated by aggregation logic 282, as indicated by block 910.

Processing moves to block 912 where a quality metric of the received worksite data is calculated by quality logic 274 based on quality data within the worksite data. Quality data can include HDOP data, as indicated by block 960, VDOP data, as indicated by block 962, pitch data as indicated by block 964, roll data, as indicated by block 966, yaw data, as indicated by block 968, x-axis data, as indicated by block 970, y-axis data, as indicated by block 972, z-axis data, as indicated by block 974, a shutter speed, as indicated by block 976, aperture data, as indicated by block 978, weather data, as indicated by block 980, obscurant data, as indicated by block 982, worksite activity data 984, among any other data that can be used to determine a data quality metric.

Upon determining a worksite data quality metric, the worksite data quality metric is compared to a quality threshold using threshold logic 276 as indicated by block 914. After the comparison of the calculated data quality metric to a quality threshold, processing proceeds to block 916 where an improvement action is identified, based on the comparison, by action identifier logic 294. For example, a quality threshold can be specific to a type of worksite data, and if a calculated data quality metric is below a quality threshold, an improvement action can be identified to supplement the received worksite data by action identifier logic 294. In one example, an improvement action can include a mobile machine traveling to a singular worksite area, where the obtained worksite data was generated, and obtain additional worksite data, as indicated by block 938. Additionally, an improvement action can be a mobile machine traveling to a plurality of worksite areas to obtain additional worksite data from these areas as indicated by block 936. In one example, a mobile machine can include UAV 112, as indicated by block 926, and/or mobile machine 104 as indicated by block 928, among other mobile machines as indicated by block 932. Further, an improvement action can include waiting before the additional worksite data is collected, as indicated by block 988. However, any improvement action is contemplated that includes obtaining additional worksite data based on a calculated worksite data quality metric.

Processing then proceeds to block 934 where a mission plan is generated by mission generator 296 for a mobile machine based on the identified improvement action by action identifier logic 294. A generated mission plan can include updating a current worksite mission, as indicated by block 918, or creating a new mission plan, as indicated by block 920. However, any of a variety of different modifications to a mission plan is contemplated herein as indicated by block 940. Next, a user interface display is controlled to generate a display as indicated by block 942. In one example, the user interface display can include the identified improvement action, as indicated by block 944, and/or a generated mission plan, as indicated by block 946. However, other worksite data and information can be displayed as well.

In one example, a user input is then detected through user input mechanism 268 either accepting or rejecting the identified improvement action and/or mission plan, as indicated by block 948. In one example, a user input can indicate an acceptance of the identified improvement action and/or generated mission plan, as indicated by block 950. A user can also reject the identified improvement action and/or mission plan as indicated by block 952. However, a variety of other user inputs can be received as well, as indicated by block 954. If a user provides a user input rejecting the proposed improvement action and/or mission plan, processing proceeds back to block 916 where an improvement action is identified by action identifier logic 294. However, if a user accepts the identified improvement action and/or generated mission plan, processing proceeds to block 958 where control signals are generated by control system 280 to execute the improvement action as part of a mission plan. In one example, the mission plan is automatically accepted without user input. In one example, control signals can be provided to an unmanned aerial vehicle or any other mobile machine in order to carry out the improvement action as part of a worksite mission.

Additionally, it is to be understood that a worksite data quality metric can be calculated for a wide variety of different worksite operations. For example, a worksite operation can include collecting agricultural field crop data, field data, forestry data, golf course data, and turf data. In one example, agricultural field crop data can include emerged plant populations, plant maturity data, plant health data, and plant yield data. Field data can include a soil surface roughness, a residue cover, a soil type, a soil organic matter, and soil moisture, among other things. Forestry data can include such things as a canopy height, under-canopy vegetation, and under-canopy topography, for example. Additionally, golf course and turf data can include a turf height, turf health, a sand trap condition, and a water feature condition, among other things.

Figure 10:
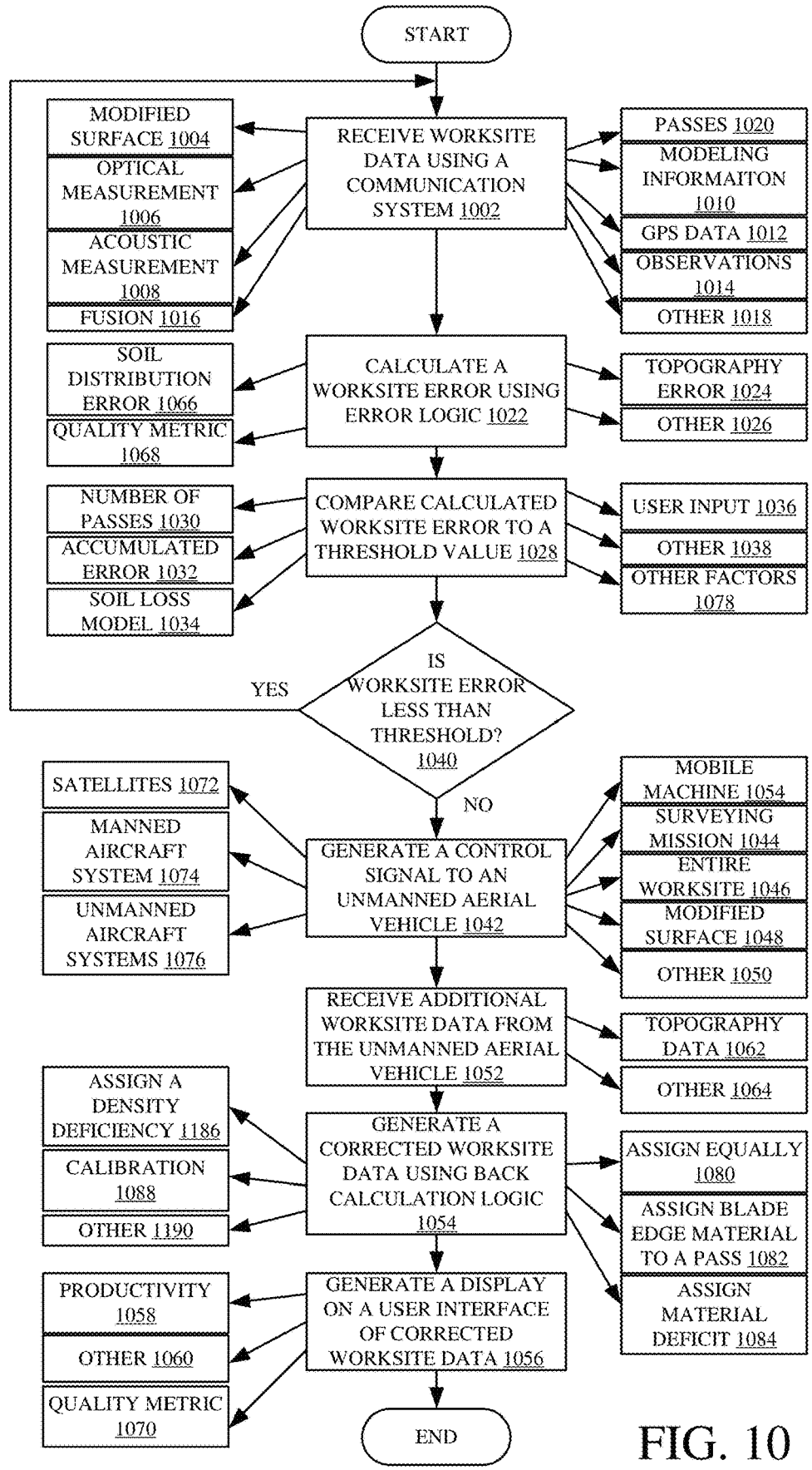
FIG. 10 is a flow diagram showing one example of obtaining supplementary worksite data based on a calculated worksite error using the UAV illustrated in FIG. 2

FIG. 10 is a flow diagram showing one example of obtaining supplementary worksite data based on a calculated worksite error using the UAV illustrated in FIG. 2. Processing begins at block 1002 where worksite data is obtained through communication system 248 of worksite control system 120 configured to receive worksite data from a mobile machine configured to carry out a worksite operation, which, in one example, can include leveling a worksite area. In one example, worksite data can include modified surface data, as indicated by block 1004, optical measurements, as indicated by block 1006, acoustic measurements, as indicated by block 1008, fusion data in combination with a kinematic model of a mobile machine, as indicated by block 1016, worksite pass data, as indicated by block 1020, modeling information, as indicated by block 1010, GPS data, as indicated by block 1012, observation data, as indicated by block 1014, among a wide variety of other data as indicated by block 1018.

Processing proceeds to block 1022 where a worksite error is calculated using error logic 286. In one example, a worksite error is estimated based on the received worksite data. This can include calculating a topographical error, as indicated by block 1024, or other worksite error corresponding to received worksite data, as indicated by block 1026. Additionally, this can include calculating a soil distribution error, as indicated by block 1066. In one example, the soil distribution error can depend on a number of ground-engaging mobile machine passes within a worksite area. Additionally, a quality metric can also be calculated by data quality system 272 from the received worksite data, as indicated by block 1068. In one example, a quality metric can include a surface smoothness measure and a target topography variation metric.

However, upon calculating a worksite error, processing moves to block 1028 where the estimated worksite error is compared to a threshold value by error threshold logic 288. In one example, a threshold value can include a number of mobile machine passes, as indicated by block 1030, an accumulated error value, as indicated by block 1032, a soil loss model, as indicated by block 1034, a user-input, as indicated by block 1036, among any other thresholds relating to a worksite error. In the example a threshold value includes a number of mobile machine passes, an estimated worksite error can correspond to a number of mobile machine passes detected within a worksite area. Additionally, a comparison of the worksite error to a threshold value, by error threshold logic 288, can also take into account other factors into the comparison, as indicated by block 1078, which, in one example, can include a ground traffic density, machine learning algorithms of field data such as a presence of vegetation, average vegetation height, variance of vegetation and obstacles, wind speed, etc. In this example, error threshold logic 288 can take into account the factors that would lead to an inaccurate worksite error calculation, and generate an indication that additional worksite data is needed to supplement the worksite data used in calculating the inaccurate worksite error.

If the calculated worksite error is less than a threshold value, processing proceeds back to block 1002 where worksite data is obtained through communication system 248 of worksite control system 120. If a worksite error is above the threshold value, processing proceeds to block 1042 where a control signal is generated by control system 280 for UAV 112. In one example, a control signal can control UAV 112 to obtain additional worksite data for a mobile machine, as indicated by block 1054, an entire worksite, as indicated by block 1046, or a modified surface as indicated by block 1048. Obtaining additional worksite data can be done by controlling UAV 112 to perform a surveying mission, as indicated by block 1044, or any other mission to obtain worksite data as indicated by block 1050. Additionally, while a control signal is illustratively transmitted from control system 280 to UAV 112, it is expressly contemplated that a control signal can be transmitted to satellites, as indicated by block 1072, manned aircraft systems, as indicated by block 1074, and/or unmanned aircraft systems, as indicated by block 1076. In one example, UAV, satellites, unmanned aircraft systems and manned aircraft systems can include survey instruments that include three dimensional (3D) photogrammetry, LIDAR or other suitable high accuracy sensors.

Additional worksite data can then be received from UAV 112 at the worksite area from which the initial worksite data was obtained, as indicated by block 1052. Additional worksite data can include highly accurate topography data, as indicated by block 1062, or any other data relating to the worksite area, as indicated by block 1064. Based on received additional worksite data, corrected worksite data can be calculated by back calculation logic 290 as indicated by block 1054. In one example, generating corrected worksite data includes assigning an error equally among mobile machine passes, as indicated by block 1080. Alternatively, this can include assigning surplus blade edge material to a pass based on a location of a material ridge relative to a recorded edge for the pass, as indicated by block 1082. Additionally, generating corrected worksite data can include assigning a material deficit to a more recent pass, as indicated by block 1084, assigning a density deficiency to a compactor pass, as indicated by block 1186, or adjusting a portion of error assigned to a pass because a quality is out of calibration, as indicated by block 1188. However, a variety of other corrected values are contemplated, as indicated by block 1190.

A display is then generated on a user interface device as indicated by block 1056. A user interface display can include a productivity indicator, as indicated by block 1058, and/or any other information derived from the corrected worksite data by back calculation logic 290. Additionally, the user interface display can include a quality metric which can include a discrete number, a set of discrete numbers, or, if it can be displayed, an overlay over an aerial map within the user interface display.

Figure 11:
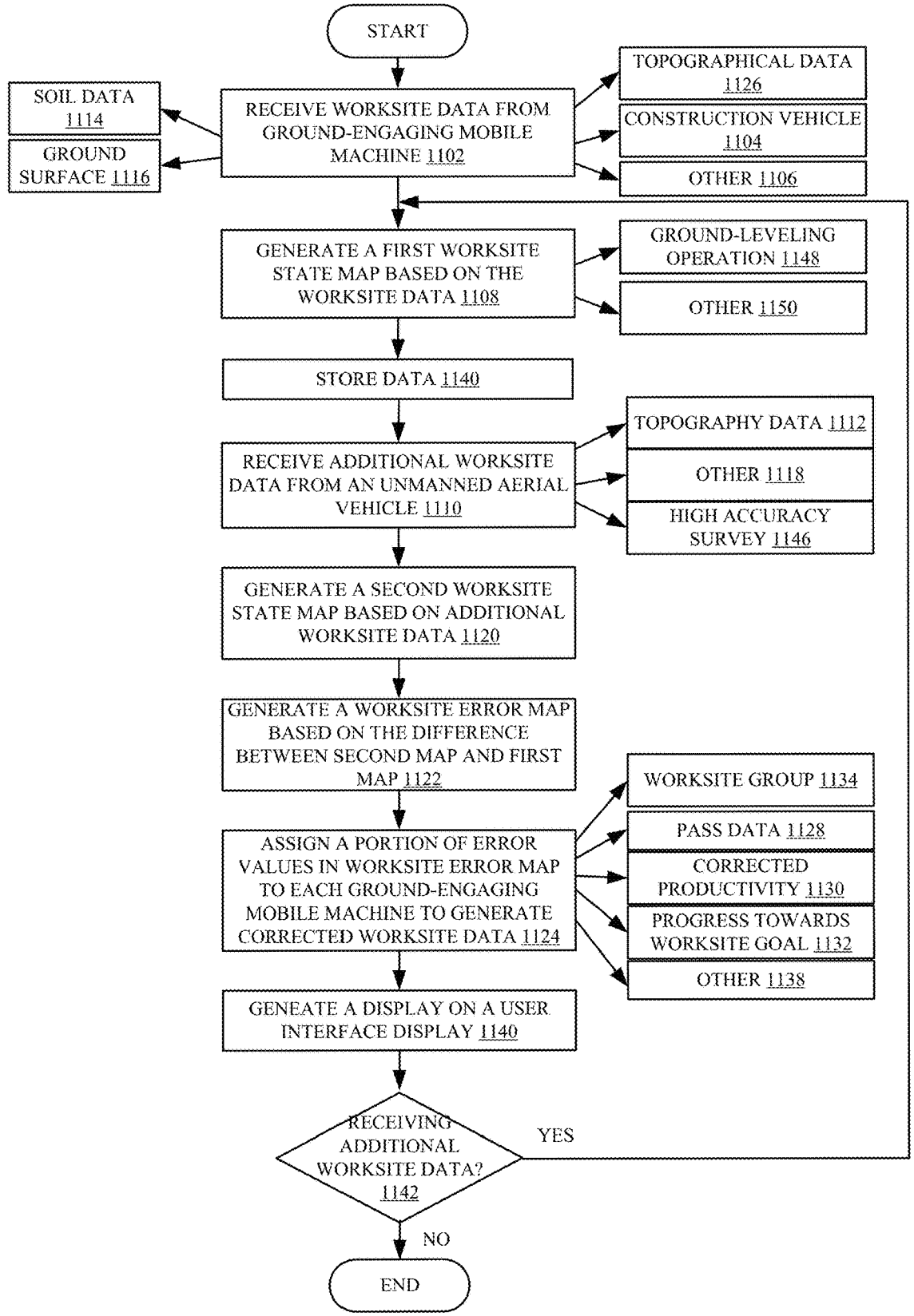
FIG. 11 is a flow diagram showing one example of generating a worksite error map using worksite data obtained from ground-engaging mobile machines and a UAV illustrated in FIG. 2.

FIG. 11 is a flow diagram showing one example of generating a worksite error map using worksite data obtained from mobile machine 104 and UAV 112 illustrated in FIG. 2. Processing begins at block 1102 where worksite data is received from ground-engaging mobile machine 104. Worksite data can include topographical data, as indicated by block 1026, soil data, as indicated by block 1114, ground surface data, as indicated by block 1116, among other worksite data as indicated by 1108. Additionally, in one example, a ground-engaging mobile machine can include a construction vehicle as indicated by block 1104, however, a variety of mobile machines are contemplated herein.

Processing proceeds to block 1108 where a first worksite state map is generated by map generation logic 302 on a user interface device based on the received worksite data from ground-engaging mobile machine 104 located at a worksite area. In one example, a first worksite state map can display ground leveling state information indicative of a state of a ground-leveling operation at the worksite area, as indicated by block 1148. Additionally, a first worksite state map can include a variety of other information, as indicated by block 1150, which can include information indicative of topography, a density, surface texture, soil moisture, and soil type, among other information. Upon generating a first worksite state map, data corresponding to the worksite state map can also be stored within data store 298, as indicated by block 1140. However, it is contemplated that received worksite data can be stored at any point within the process.

Processing then moves to block 1110 where additional worksite data is received from UAV 112 located at the worksite area from which the initial worksite data was obtained. In one example, additional worksite data includes topography data, as indicated by block 1112, or any other worksite data as indicated by 1118. In one example, additional worksite data can be obtained from UAV 112 as a part of a high accuracy survey of the worksite area where the initial worksite data was obtained, as indicated by block 1146. From the received additional worksite data, processing proceeds to block 1120 where a second worksite state map is generated by map generation logic 302 from the additional worksite data received from UAV 112. Based on a difference between the first worksite state map and the second worksite state map, a worksite error map is then generated by map generation logic 302 as indicated by block 1122.

Processing moves to block 1124 where error values are assigned by back calculation logic 290 to each ground-engaging mobile machine from the worksite error map, based on a criteria, to generate corrected worksite data for the mobile machines. In one example, corrected worksite data includes corrected pass data, as indicated by block 1128, and/or a corrected productivity, as indicated by block 1130. Additionally, corrected worksite data can be assigned to a plurality of mobile machines located at a worksite area as indicated by block 1134. Subsequently, an accurate progress towards a worksite operation can be determined by back calculation logic 290 as well, as indicated by block 1132. However, a wide variety of information can be determined from the worksite error map, as indicated by block 1138.

A user display mechanism is controlled by user interface logic 264 to generate a display for a user as indicated by block 1140. In one example, the generated user interface can include any information obtained from the generated worksite error map, such as corrected worksite data which includes a productivity of a ground-engaging mobile machine, pass data, operator productivity, pass productivity, etc. Upon generating a user display, processing then turns to block 1142 where a determination is made by error logic 286 whether additional worksite data is received from ground-engaging mobile machines. If yes, processing proceeds back to block 1108 where a worksite state map is generated by map generation logic 302 based on the worksite data received from the ground-engaging mobile machines. However, if no additional worksite data is received from ground-engaging mobile machines, processing subsequently ends.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 12:
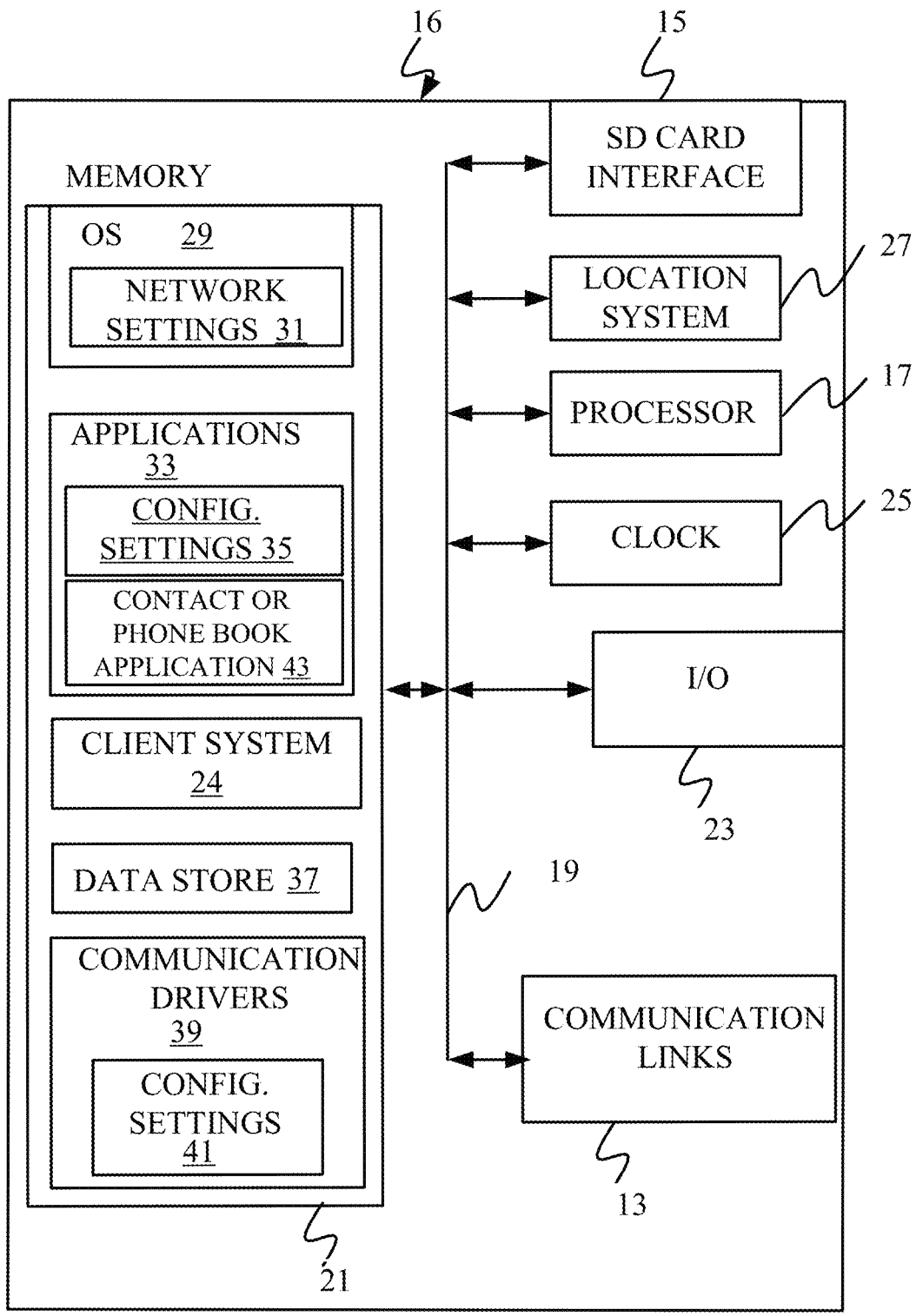
FIGS. 12-14 show examples of mobile devices that can be used in the worksite architectures shown in the previous figures.
Figure 13:
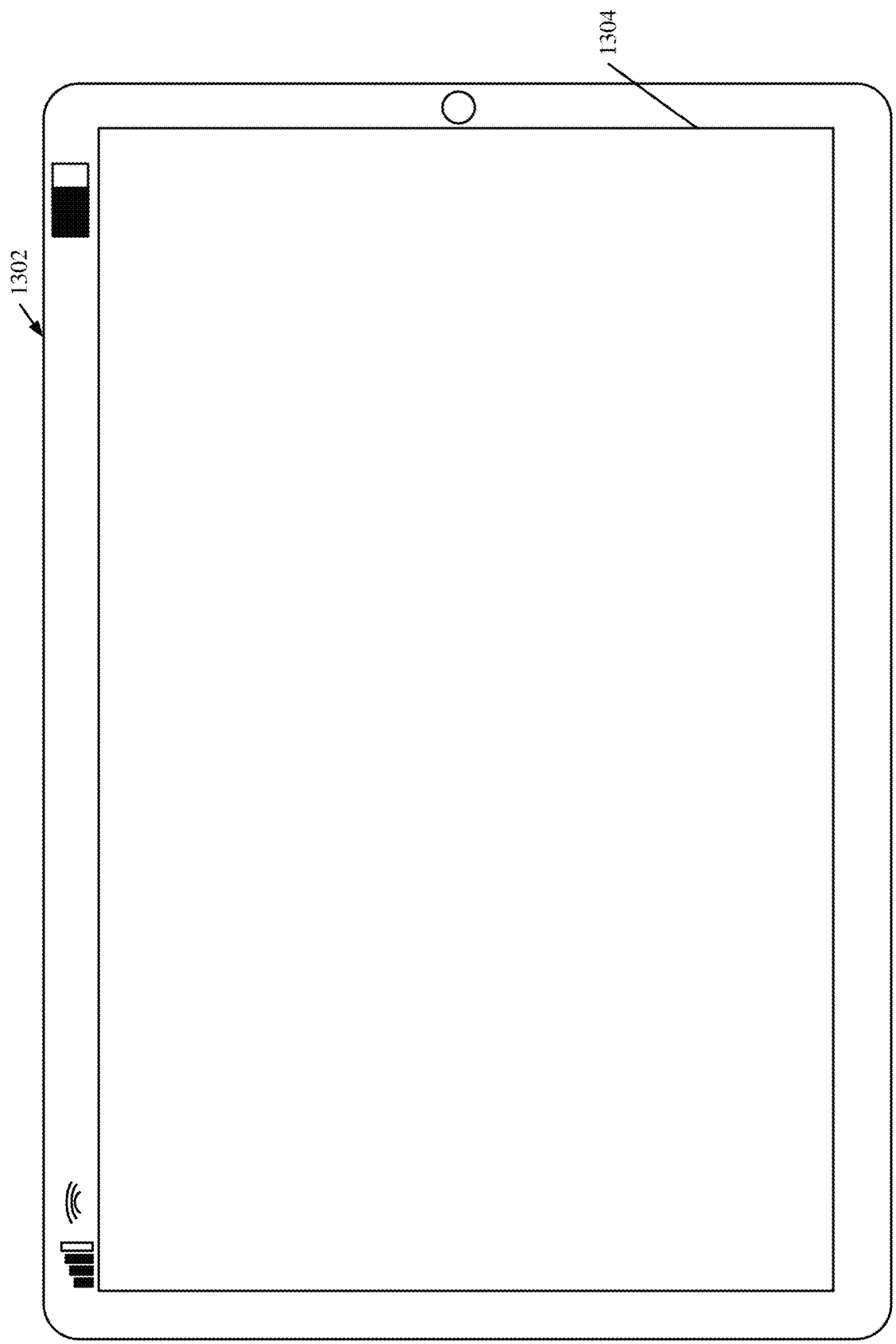
Figure 14:
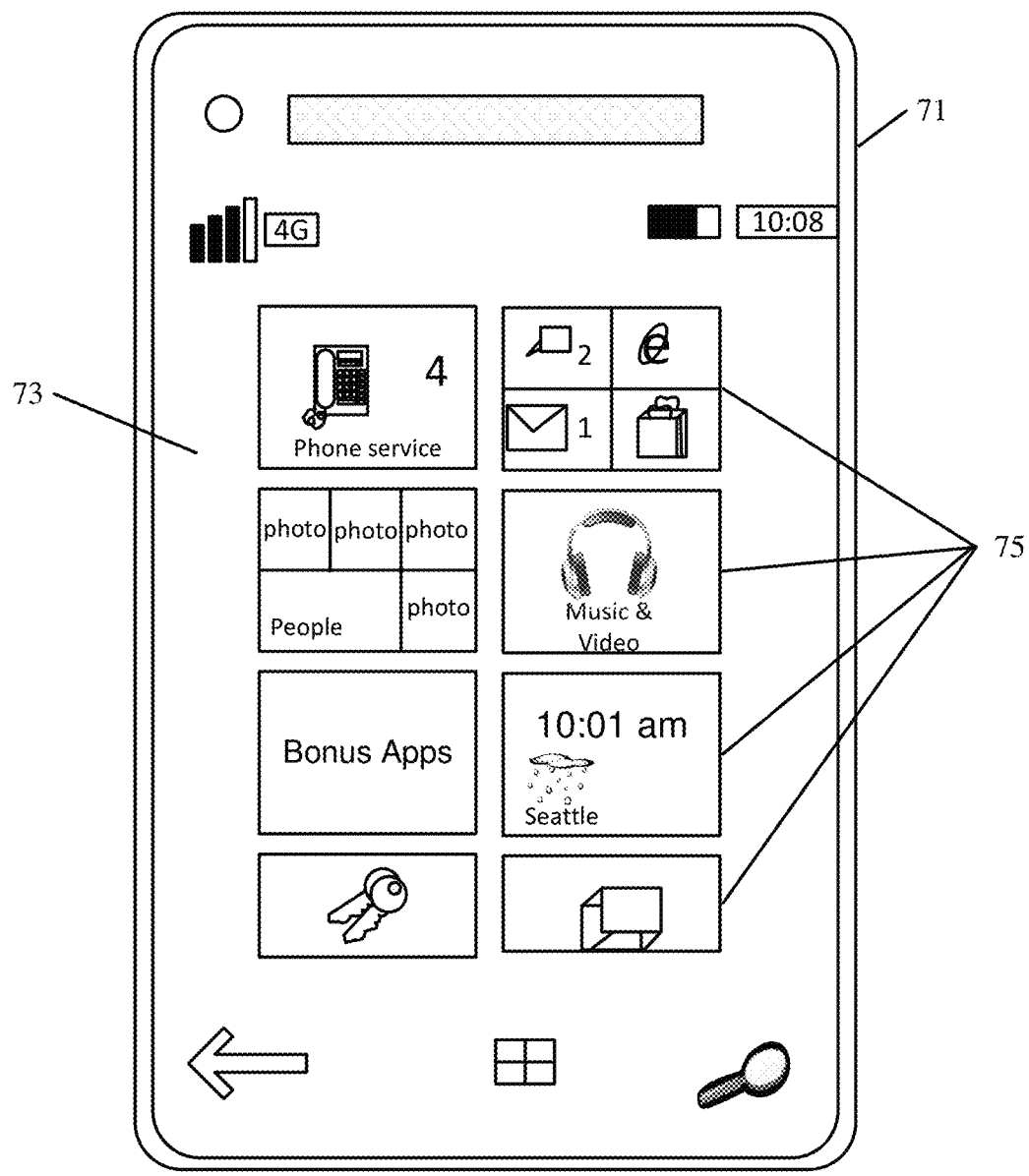

FIG. 12 is a simplified block diagram of one illustrative example of a handheld or mobile computing device that can be used as a user's or client's hand held device 16, in which the present system (or parts of it) can be deployed. For instance, a mobile device can be deployed as worksite control system 120 in the operator compartment of mobile machine 104 for use in generating, processing, or displaying the information discussed herein and in generating a control interface. FIGS. 13-14 are examples of handheld or mobile devices.

FIG. 12 provides a general block diagram of the components of a client device 16 that can run some components shown in FIG. 2, that interacts with them, or both. In the device 16, a communications link 13 is provided that allows the handheld device to communicate with other computing devices and in some examples provide a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real-time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 13 shows one example in which device 16 is a tablet computer 1302. In FIG. 13, computer 1302 is shown with user interface display screen 1304. Screen 1304 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 1302 can also illustratively receive voice inputs as well.

FIG. 14 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 15:
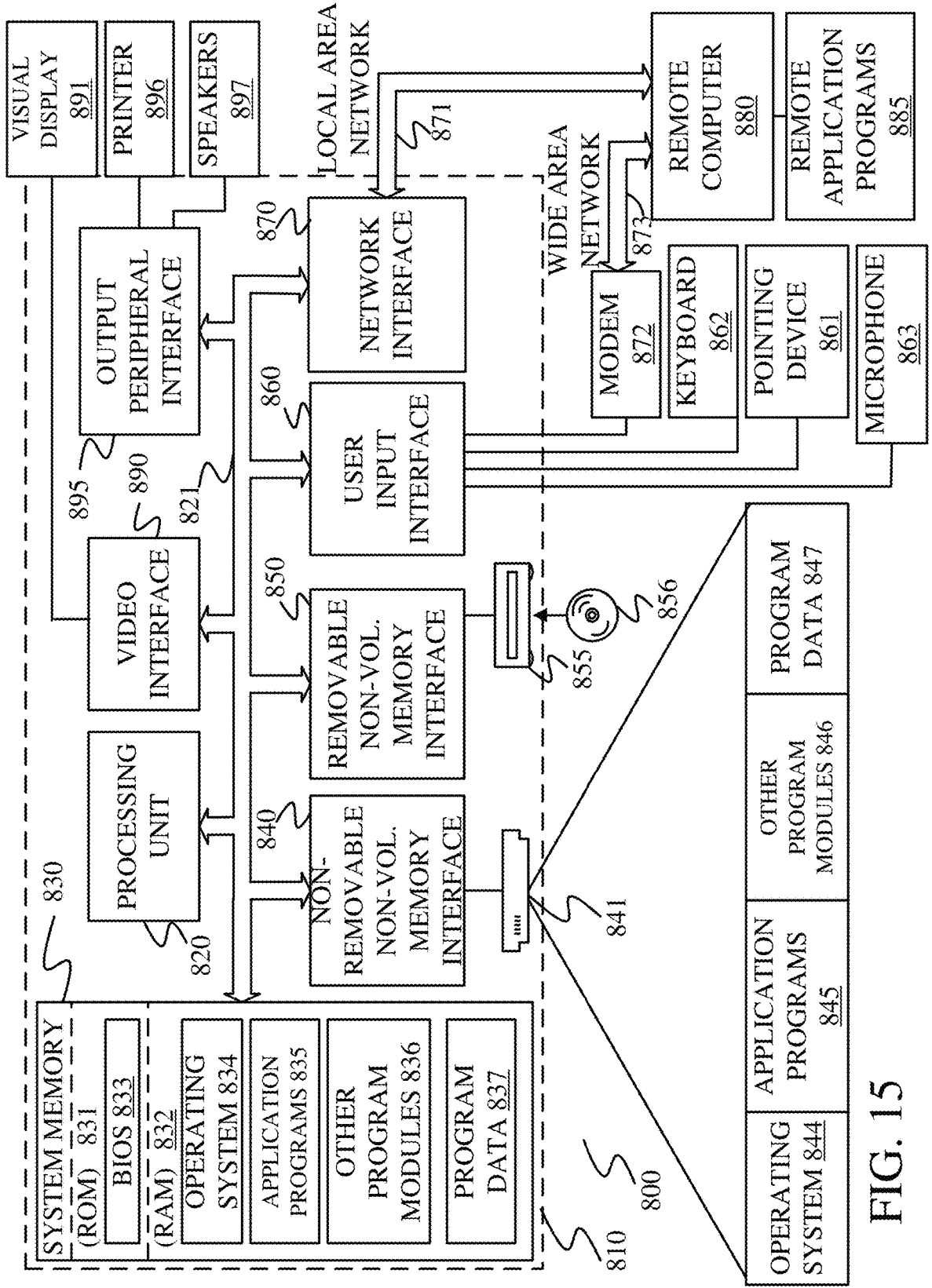
FIG. 15 is a block diagram of one example of a computing environment that can be used in the architectures shown in the previous figures.

FIG. 15 is one example of a computing environment in which elements of FIG. 2, or parts of it, (for example) can be deployed. With reference to FIG. 15, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 2 can be deployed in corresponding portions of FIG. 15.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 15 illustrates operating system 834, application programs 835, other program modules 836, and program data 837.

The computer 810 may also include other removable/non-removable volatile/nonvolatile computer storage media. By way of example only, FIG. 15 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 15, provide storage of computer readable instructions, data structures, program modules and other data for the computer 810. In FIG. 15, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 15 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a worksite control system, comprising:
area identifier logic configured to receive a position input, indicative of a position of landscape modifiers within a worksite, from a position detection system and, based on the position input, identify types of worksite areas within the worksite and generate an area identifier output indicative of the types of worksite areas and a location of the worksite areas within the worksite;
prioritizing logic configured to receive the area identifier output from the area identifier component and prioritize the worksite areas based on the type; and
a route generator configured to generate a route for an unmanned aerial vehicle (UAV) based on the prioritized worksite areas.

Example 2 is the worksite control system of any or all previous examples further comprising:
a control system configured to generate a control signal for the UAV based on the route; and
a communication system configured to communicate the control signal to the UAV, and wherein the UAV is configured to conduct a worksite mission based on the received control signal.

Example 3 is the worksite control system of any or all previous examples wherein the control system is configured to control the UAV to perform the worksite mission by flying to the prioritized worksite areas in an order based on priority and collecting worksite data for the prioritized worksite areas.

Example 4 is the worksite control system of any or all previous examples wherein the area identifier logic is configured to identify types of worksite areas comprising fixed worksite areas and dynamic worksite areas based on the position of the landscape modifiers within the worksite.

Example 5 is the worksite control system of any or all previous examples wherein the prioritizing component is configured to prioritize dynamic worksite areas over fixed worksite areas.

Example 6 is the worksite control system of any or all previous examples, further comprising:
a user interface device; and
user interface logic configured to generate a display of the worksite areas within the worksite, on the user interface device, to a user of the worksite control system.

Example 7 is the worksite control system of any or all previous examples wherein the user interface logic is configured to generate and display a location of the landscape modifiers on the user interface device.

Example 8 is the worksite control system of any or all previous examples wherein the user interface logic is further configured to generate and display landscape modifier identifiers, on the user interface device, that identify the landscape modifiers to the user of the worksite control system.

Example 9 is the worksite control system of any or all previous examples, further comprising:
an update generator configured to calculate an update value for each worksite area within the worksite based on received worksite data for a worksite area within the worksite.

Example 10 is the worksite control system of any or all previous examples wherein the update generator calculates the update value comprising at least one of: a time of a last update for the worksite area, a time since the last update for the worksite area, or a time until a next scheduled update for the worksite area.

Example 11 is the worksite control system of any or all previous examples wherein the update generator calculates the update value comprising at least one of: a number of mobile machine passes at the worksite area since a last update or an accumulated elevation error since a last update.

Example 12 is the worksite control system of any or all previous examples wherein the user interface logic is configured to generate and display a visual cue on the user interface device indicative of the calculated update value for each worksite area, the visual cue comprising at least one of: a color, a pattern, a texture or an intensity.

Example 13 is a worksite control system, comprising:
a user input mechanism configured to receive a user input indicative of field data for a worksite and at least one vehicle control variable for controlling an unmanned aerial vehicle (UAV) to carry out a worksite mission within the worksite;
calculation logic configured to calculate dependent variables related to the field data and at least one vehicle control variable based on the received user input indicating the field data and the at least one vehicle control variable;
user interface logic configured to generate a display of the calculated dependent variables along with the field data and at least one vehicle control variable to a user of the worksite control system on a user interface device; and
a control system configured to generate control signals to the UAV based on the field data, the least one vehicle control variable and calculated dependent variables.

Example 14 is the worksite control system of any or all previous examples wherein the input component is configured to receive the user input indicating a mission planning variable.

Example 15 is the worksite control system of any or all previous examples wherein the input component is configured to receive the user input indicating an architectural or operating parameter of the UAV configured to carry out the worksite mission within the worksite.

Example 16 is the worksite control system of any or all previous examples wherein the calculation logic is configured to calculate dependent variables comprising mission parameter values for the UAV.

Example 17 is the worksite control system of any or all previous examples wherein the input component is further configured to receive a user input that fixes the at least one vehicle control variable at a specific value.

Example 18 is a computer-implemented method, comprising:
generating a route for an unmanned aerial vehicle (UAV), configured to carry out a worksite mission, based on prioritized worksite areas within a worksite;
receiving a user input indicative of field data for the worksite and at least one vehicle control variable corresponding to the UAV;
calculating dependent variables relating to the field data and the at least one vehicle control variable based on the received user input;
displaying the calculated dependent variables along with the field data and at least one vehicle control parameter to a user on a user interface device; and
generating a control signal to the UAV based on the route and calculated dependent variables.

Example 19 is the method of any or all previous examples wherein the prioritized worksite areas comprise fixed worksite areas and dynamic worksite areas, and are identified based on a position of landscape modifiers within the worksite.

Example 20 is the method of any or all previous examples wherein receiving the user input indicative of field data for the worksite and at least one vehicle control variable comprises:
locking the at least one vehicle control variable so that a value of the at least one vehicle control variable becomes fixed.

What is claimed is:
1. A worksite control system, comprising:
area identifier logic configured to receive a position input, indicative of a position of landscape modifiers within a worksite, from a position detection system and, based on the position input, identify types of worksite areas within the worksite and generate an area identifier output indicative of the types of worksite areas and a location of the worksite areas within the worksite;
prioritizing logic configured to receive the area identifier output from the area identifier component and prioritize the worksite areas based on the type;
an update generator configured to calculate an update value for at least one worksite area based on a duration of time relative to acquisition of data for the at least one worksite area;
a route generator configured to generate a route for an unmanned aerial vehicle (UAV) based on the prioritized worksite areas; and
a control system configured to generate control signals to the UAV based on the route.

2. The worksite control system of claim 1, wherein the control system comprises:
a communication system configured to communicate the route to the UAV, and wherein the UAV is configured to conduct a worksite mission based on the received route.

3. The worksite control system of claim 2, wherein the control system is configured to control the UAV to perform the worksite mission by flying to the prioritized worksite areas in an order based on priority and collecting worksite data for the prioritized worksite areas.

4. The worksite control system of claim 2, wherein the area identifier logic is configured to identify types of worksite areas comprising fixed worksite areas and dynamic worksite areas based on the position of the landscape modifiers within the worksite.

5. The worksite control system of claim 4, wherein the prioritizing logic is configured to prioritize fixed worksite areas over dynamic worksite areas.

6. The worksite control system of claim 1, further comprising:
a user interface device; and
user interface logic configured to generate a display of the worksite areas within the worksite, on the user interface device, to a user of the worksite control system.

7. The worksite control system of claim 6, wherein the user interface logic is configured to generate and display a location of the landscape modifiers on the user interface device.

8. The worksite control system of claim 7, wherein the user interface logic is further configured to generate and display landscape modifier identifiers, on the user interface device, that identify the landscape modifiers to the user of the worksite control system.

9. The worksite control system of claim 1, wherein the duration of time indicates an amount of time since worksite data has been received for the at least one worksite area.

10. The worksite control system of claim 1, wherein the duration of time indicates an amount of time until additional data will be received for the at least one worksite area.

11. The worksite control system of claim 6, wherein the user interface logic is configured to generate and display a visual cue on the user interface device indicative of the calculated update value for each worksite area.

12. The worksite control system of claim 11, wherein the user interface logic is configured to generate and display the visual cue as a color change on the user interface device indicative of the duration of time.

13. A computer-implemented method, comprising:
generating a route for an unmanned aerial vehicle (UAV), configured to carry out a worksite mission, based on prioritized worksite areas within a worksite, wherein the prioritized worksite areas comprise fixed worksite areas and dynamic worksite areas and are identified based on position of landscape modifiers within the worksite;
receiving a user input indicative of field data for the worksite and at least one vehicle control variable corresponding to the UAV;
calculating dependent variables relating to the field data and the at least one vehicle control variable based on the received user input;
displaying the calculated dependent variables along with the field data and at least one vehicle control parameter to a user on a user interface device; and
generating a control signal to the UAV based on the route and calculated dependent variables.

14. The method of claim 13, wherein receiving the user input indicative of field data for the worksite and at least one vehicle control variable comprises:
locking the at least one vehicle control variable so that a value of the at least one vehicle control variable becomes fixed.

15. The method of claim 13, wherein dynamic worksite areas are prioritized over fixed worksite areas.

16. A worksite control system, comprising:
area identifier logic configured to receive data indicative of a characteristic of landscape modifiers within a worksite and, based on the data indicative of the characteristic of landscape modifiers within the worksite, identify types of worksite areas within the worksite, the types of worksite areas being either fixed or dynamic;
prioritizing logic configured to prioritize the worksite areas based on the type;
a route generator configured to generate a route for an unmanned aerial vehicle (UAV) based on the prioritized worksite areas; and
a controller configured to generate control signals to the UAV based on the route.

17. The worksite control system of claim 16, wherein the characteristic is indicative of positions of the landscape modifiers within the worksite.

18. The worksite control system of claim 16, wherein the characteristic is indicative of types of landscape modifiers within the worksite.

19. The worksite control system of claim 16, wherein the characteristic is indicative of a number of landscape modifiers within the worksite.

20. The worksite control system of claim 16, wherein the prioritizing component is configured to prioritize dynamic worksite areas over fixed worksite areas.

* * * * *